United States Patent
Aumond et al.

(10) Patent No.: US 6,489,611 B1
(45) Date of Patent: Dec. 3, 2002

(54) ATOMIC FORCE MICROSCOPE FOR PROFILING HIGH ASPECT RATIO SAMPLES

(75) Inventors: Bernardo D. Aumond, Cambridge, MA (US); Kamal Youcef-Toumi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/410,123

(22) Filed: Sep. 30, 1999

Related U.S. Application Data
(60) Provisional application No. 60/103,463, filed on Oct. 7, 1998.

(51) Int. Cl.[7] .............................................. G01N 13/16
(52) U.S. Cl. ........................................ 250/306; 250/307
(58) Field of Search .................................. 250/307, 306

(56) References Cited

U.S. PATENT DOCUMENTS

| | | | |
|---|---|---|---|
| 4,714,327 A | 12/1987 | Marshall | 350/504 |
| 4,724,318 A | 2/1988 | Binnig | 250/306 |
| 4,902,892 A | 2/1990 | Okayama et al. | 250/307 |
| 5,144,128 A | 9/1992 | Hasegawa et al. | 250/306 |
| 5,144,833 A | 9/1992 | Amer et al. | 73/105 |
| 5,166,516 A | 11/1992 | Kajimura | 250/234 |
| 5,237,859 A | 8/1993 | Elings et al. | 73/105 |
| 5,426,302 A | * 6/1995 | Marchman et al. | 250/307 |
| 5,448,399 A | 9/1995 | Park et al. | 359/372 |
| 5,614,712 A | 3/1997 | Ray | 250/307 |
| 5,714,682 A | 2/1998 | Prater et al. | 73/105 |
| 5,760,396 A | 6/1998 | Lindsay et al. | 250/306 |
| 5,801,381 A | 9/1998 | Flecha et al. | 250/306 |
| 5,854,487 A | 12/1998 | Braunstein et al. | 250/306 |
| 5,877,891 A | 3/1999 | Park et al. | 359/372 |

FOREIGN PATENT DOCUMENTS

| | | |
|---|---|---|
| EP | 0497288 | 8/1992 |
| EP | 0790482 | 8/1997 |

OTHER PUBLICATIONS

D. W. Pohl et al., "Tracking Tunneling Microscopy", Rev Sci. Instrum. 59 (6), Jun. 1988, American Institute of Physics, pp. 840–842.

"High Precision Profilometry", Bernardo Dantas Aumond, Submitted to the Department of Mechnical Engineering in Partial Fulfillment of the Requirements for the Degree of Master of Science in Mechanical Engineering at the Mass. Institute of Technology, Aug. 1997, pp. 1–56.

"Experimental High Precision Profilometry of High Aspect Ratio Samples", Bernardo Dantas Aumond et al., Mass. Institute of Technology, 6 pages.

"High Precision Surface Profilometry: From Stylus to STM", Chap. 14, Derek G. Chetwynd et al., pp. 272–299.

(List continued on next page.)

*Primary Examiner*—Bruce Anderson
(74) *Attorney, Agent, or Firm*—Daly, Crowley & Mofford, LLP

(57) ABSTRACT

Apparatus and methods are provided for using atomic force microscopy for profiling high aspect ratio features. Probe landing techniques include scanning prior to bringing the probe into contact with the feature. In one embodiment, the probe assembly cantilever is brought into contact with the feature and subsequent scanning is used to locate the feature with the probe. In another embodiment, the probe is moved in a scanning pattern in progressively lower horizontal planes until the probe contacts the sample feature. Also described is a deconvolution technique for deconvolving the sample image and a technique for measuring the tip radius of the feature.

11 Claims, 17 Drawing Sheets-

OTHER PUBLICATIONS

"Design and Implementation of a High Precision Profilometer", Tarzen Kwok, Mechanical Engineering (1992), Univ. of Hawaii, Submitted to the Dept. of Mechanical Engineering in Partial Fulfillment of the Requirements for the degree of Master of Science in Mechanical Engineering at the Mass. Institute of Technology, Feb. 1995, 115 pages.

"Tip Surface Interactions in STM and AFM", J. B. Pethica, Physica Scripta vol. T19, 1987, pp. 61–66.

"Atomic Force Microscope—Force Mapping and Profiling on a Sub 100–Å Scale", Y. Martin et al., J. Appl. Phys. 61 (10), May 15, 1987, pp. 4723–4729.

"Stylus Profiling Instrument for Measuring Statistical Properties of Smooth Optical Surfaces", J. M. Bennett et al., Applied Optics, vol. 20, No. 10, May 15, 1981, pp. 1785–1802.

"Dimensional Metrology With Scanning Probe Microscopes", Joseph E. Griffith et al., J. Appl. Phys. 74 (9), American Institute of Physics, Nov. 1, 1993, pp. R83–R109.

"Reconstruction of STM and AFM Images Distorted by Finite–Size Tips", David Keller, Surface Science 253, Elsevier Science Publishers B. V. (North Holland), 1991, pp. 353–364.

"Atomic Force Microscope", G. Binnig et al., Physical Review Letters, vol. 56, No. 9, Mar. 3, 1986, pp. 930–933.

"An Atomic–Resolution Atomic–Force Microscope Implemented Using An Optical Lever", S. Alexander et al., J. Appl. Phys. 65 (1), American Institute of Physics, Jan. 1, 1989, pp. 164–167.

"Surface Studies by Scanning Tunneling Microscopy", G. Binning et al., Physical Review Letters, vol. 49, No. 1, The American Physical Society, Jul. 5, 1982, pp. 57–61.

"Atomic Resolution With An Atomic Force Microscope Using Piezoresistive Detection", M. Tortonese et al., Appl. Phys. Lett. 62 (8), American Institute of Physics, Feb. 22, 1993, pp. 934–986.

"Data Processing in Nanoscale Profilometry", Cheng Jung Chiu, Submitted to the Dept. of Mechanical Engineering in Partial Fulfillment of the Requirements for the degree of Master of Science in Mechanical Engineering at the Mass. Institute of Technology, May 1995, 177 pages.

\* cited by examiner

ATOMIC FORCE MICROSCOPE FOR PROFILING HIGH ASPECT RATIO SAMPLES

CROSS-REFERENCE TO RELATED APPLICATIONS

This application claims priority under 35 U.S.C. §119(e) to U.S. Provisional Patent Application No. 60/103,463 entitled "Atomic Force Microscope for Profiling High Aspect Ratio Samples," filed on Oct. 7, 1998, which is incorporated herein by reference in its entirety.

STATEMENTS REGARDING FEDERALLY SPONSORED RESEARCH

Not applicable.

BACKGROUND OF THE INVENTION

Obtaining images of high aspect ratio structures poses certain challenges. High aspect ratio structures are those where one characteristic dimension is more pronounced than the others. Examples of these type of structures include probes of atomic force and scanning tunnelling microscopes, field emission probes, micro-indenters and Micro Electro-Mechanical systems (MEM'S) structures. Such high aspect ratio structures have typical heights on the order of tens of micrometers and tip radii in the range of tens of nanometers. Further, these structures may or may not be conductive.

In imaging such structures, it is sometimes desirable to image the side walls of the structure and to measure the radius of the tip of the structure in a non-destructive manner. Desired image resolutions can be on the order of 1 nm in the vertical (normal to the surface) direction and 10 nm in the lateral direction. Such imaging criteria prevent the use of certain types of profilometry methods.

In one type of conventional stylus profilometer, a stylus with a sharp tip is mechanically dragged along the sample surface. The deflection of the hinged stylus arm is measured and recorded as the surface profile. The use of a hinged stylus arm allows measurement of very rough surfaces, for example those with peak-to-peak heights greater than 1 mm. Probe-to-surface contact forces range from $10^{-3}$ N to $10^{-6}$ N. However, since the hinged stylus arm is partially supported by the stylus itself, physical rigidity limits the minimum stylus tip radius and hence the lateral resolution to about 0.1 mm.

In optical profilometry, many different optical phenomena (such as interference and internal reflection) can be utilized. The most popular technique is based on phase-measuring interferometry, in which a light beam reflecting off the sample surface is interfered with a phase-varied reference beam. The surface profile is deduced from the resulting fringe patterns. With a collimated light beam and a large photodetector array, the entire surface can be profiled simultaneously. This and other conventional optical profilometry methods are limited in lateral resolution by the minimum focussing spot size of about 0.5 $\mu$m (for visible light). In addition, measurement values are dependent on the surface reflectivity of the material being profiled.

Currently, only the recently developed scanning probe microscopes can meet a 10 nm lateral resolution requirement. In these microscopes, an atomically sharp (or nearly so) tip at a very close spacing to the sample surface is moved over the surface using a piezoactuator. One type of scanning probe microscope is the atomic force microscope (AFM), which measures the topography of a surface with a probe that has a very sharp tip. A probe assembly includes a cantilever beam from which the probe, or microstylus extends. The probe terminates at the probe tip having a typical tip radius of less than 0.1 $\mu$m. The probe typically has a length on the order of a couple of micrometers and the cantilever beam typically has a length between 100 $\mu$m and 200 $\mu$m.

As is illustrated in FIG. 1, the AFM can operate in two different regimes, contact and non-contact, depending on the spacing maintained between the probe and sample. In the contact regime, the probe is kept some angstroms from the sample surface and the interactions are mainly repulsive. In the non-contact regime, the spacing between the probe and the sample surface is from tens to hundreds of angstroms and the interactions are attractive, mainly due to the long range van der Waals forces.

In a contact mode atomic force microscope, the probe is moved relative to the surface of a sample and deflection of the cantilever is measured to provide a measure of the surface topography. More particularly, a laser beam is directed toward, and reflects off the back surface of the cantilever to impinge upon a sensor, such as a photodetector array. The electrical output signals of the photodetector array provide a topographical image of the sample surface and, further, provide feedback signals to a fine motion actuator, sometimes provided in the form of a piezoelectric actuator. In a constant force contact AFM, the fine motion actuator is responsive to the feedback signals for maintaining a substantially constant force between the probe tip and the sample, such as forces on the order of $10^{-8}$ N to $10^{-11}$ N.

Initial contact between the probe and the sample is conventionally achieved with the assistance of a camera located above the sample. The probe and sample are visualized with the camera and, once the probe is positioned at a desired area of the sample, the user actuates a coarse motion actuator which moves the probe into contact with the sample surface. Generally, the coarse motion actuator has a relatively large vertical range, such as on the order of 2–10 centimeters.

Contact atomic force microscopy offers high lateral and vertical resolutions, such as less than 1 nm vertical resolution and less than 50 nm lateral resolution. Further, since the contact AFM relies on contact forces rather than on magnetic or electric surface effects, advantageously the contact AFM can be used to profile conductive and non-conductive samples. However, the maximum surface roughness that can be profiled is much less than that of conventional stylus profilometers which use a linear variable differential transducer (LVDT).

In the non-contact atomic force microscope, long range van der Waals forces are measured by vibrating the cantilever near its resonance frequency and detecting the change in the vibrational amplitude of a laser beam reflected off the cantilever due to a change in the force gradient caused by changes in the surface profile. The non-contact atomic force microscope offers non-invasive profiling. However, the technique has some disadvantages when compared to contact atomic force microscopy. First, van der Waals forces are hard-to-measure weak forces, rendering the microscope more susceptible to noise. Secondly, the probe tip must be maintained at a fixed height above the sample, typically on the order of a few nanometers, and the feedback control necessary to maintain this spacing must operate slowly to avoid crashing the probe tip on the sample. Thirdly, since the tip is always floating above the surface, the effective tip radius is increased and hence the achievable lateral resolution is decreased.

BRIEF SUMMARY OF THE INVENTION

According to the invention, methods and apparatus utilizing contact atomic force microscopy are provided for profiling both conductive and non-conductive samples having high aspect ratio structures, with a lateral resolution on the order of 10 nm and a vertical resolution on the order of 1 nm. Conventional atomic force microscopes are typically used to provide a topographical image of relatively flat surfaces and certain problems arise when using atomic force microscopy to profile high aspect ratio features. As a result, high aspect ratio structures are most typically imaged under a Scanning Electron Microscope (SEM). However, AFM imaging is more desirable because the topographic data retrieved is already in numerical format, whereas SEM pictures must be interpreted, based on the image contrast.

Various aspects of the present invention address and overcome the problems faced when using an AFM for profiling high aspect ratio structures. In conventional AFMs, a user controllable coarse motion actuator is used to bring the probe into initial contact with a desired area of the sample surface with the assistance of a camera. Although the camera facilitates landing the probe in a desired area of the sample, due to the extremely small dimensions of the probe tip and high aspect ratio features and also due to the practical resolution limitations of the camera, this technique is not generally capable of reliably landing the probe tip on a high aspect ratio feature to be profiled. If the probe tip initially lands at the base of a feature, the fine motion actuator used to scan the sample during image acquisition may not have sufficient vertical range to permit the probe tip to climb from the base of a feature to its apex. Further, such climbing induces undesirable wear on the probe.

The probe landing techniques described herein are used to ensure that initial contact of the probe is with the apex region of a high aspect ratio feature to be profiled. This is achieved by performing scanning steps prior to bringing the probe into contact with the sample. More particularly, the described probe landing techniques include moving the probe relative to the feature until the probe tip is in close proximity to the feature, moving the probe in a first scanning pattern to locate the feature, and then moving the probe in a second scanning pattern to image the feature once the feature is located.

One embodiment of the invention, referred to as the cantilever landing technique, includes the additional step of landing the cantilever of the probe assembly on the feature prior to moving the probe in the first scanning pattern. Once the cantilever contacts the feature, the probe scans "backwards" to locate the feature.

In another embodiment, referred to as the progressive approach and engagement technique, movement of the probe in the first scanning pattern includes initially moving the probe in a scanning pattern in air. The probe is progressively lowered to scan in lower and lower horizontal planes until contact of the probe with the feature is detected.

The probe tip is brought into close proximity with the sample feature using at least one camera. For example, in the cantilever landing embodiment, the probe is brought into close proximity with the feature by visualizing the cantilever and feature and moving the probe relative to the feature until the cantilever and feature are in intersecting vertical alignment. Since the cantilever beam contacts the feature, the resolution provided by a top view of the sample is sufficient to achieve the benefits of the cantilever landing technique. In the progressive approach and engagement technique, preferably, the AFM includes a second camera laterally positioned with respect to the sample which is used in conjunction with the vertically positioned camera in order to more closely locate the probe tip relative to the feature prior to scanning.

In accordance with a further aspect of the invention, a deconvolution strategy is provided. Deconvolution is necessary in applications in which the sample feature dimensions are in the same range as the size of the probe tip, therefore resulting in strong image convolution. The deconvolution technique includes scanning a standard sample with a probe to provide a mean curve for the probe shape, an inner curve for the probe shape, and an outer curve for the probe shape, thereby characterizing the probe shape. The standard sample is a physical sample for which a theoretical description is provided including a curve of the sample's mean profile and curves of the inner and outer bounds of the sample's profile. The theoretical curves are compared to the scanned image of the standard sample to provide the inner, outer, and mean curves for the probe shape.

Thereafter, a sample to be profiled is scanned with the probe to provide an image of the sample. The sample image is then deconvolved using the mean curve for the probe shape, the inner curve for the probe shape, and the outer curve for the probe shape to provide a mean curve for the sample, an inner curve for the sample, and an outer curve for the sample.

Also described is a technique for measuring the tip radius of high aspect ratio features which includes selecting points along the apex of the image, fitting a circle to the points such as with the use of a progressive least square technique, and measuring the error associated with the circle. If the measured error is smaller than a predetermined error, then at least one additional point along the apex of the image is selected and the preceding steps are repeated. Alternatively, if the measured error is greater than the predetermined error, then the best fit has been found and the radius of the circle is provided as the radius of the profiled feature. Illustrative measures of error include a maximum individual error between a point on a fitted circle and the feature image (i.e., a Maximum Fitting Error, or MFE) and a cumulative error between each of the selected points on the fitted circle and the feature image (i.e., a Maximum Distributed Error, or MDE). In one embodiment, both the MFE and MDE are used to measure the tip radius.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
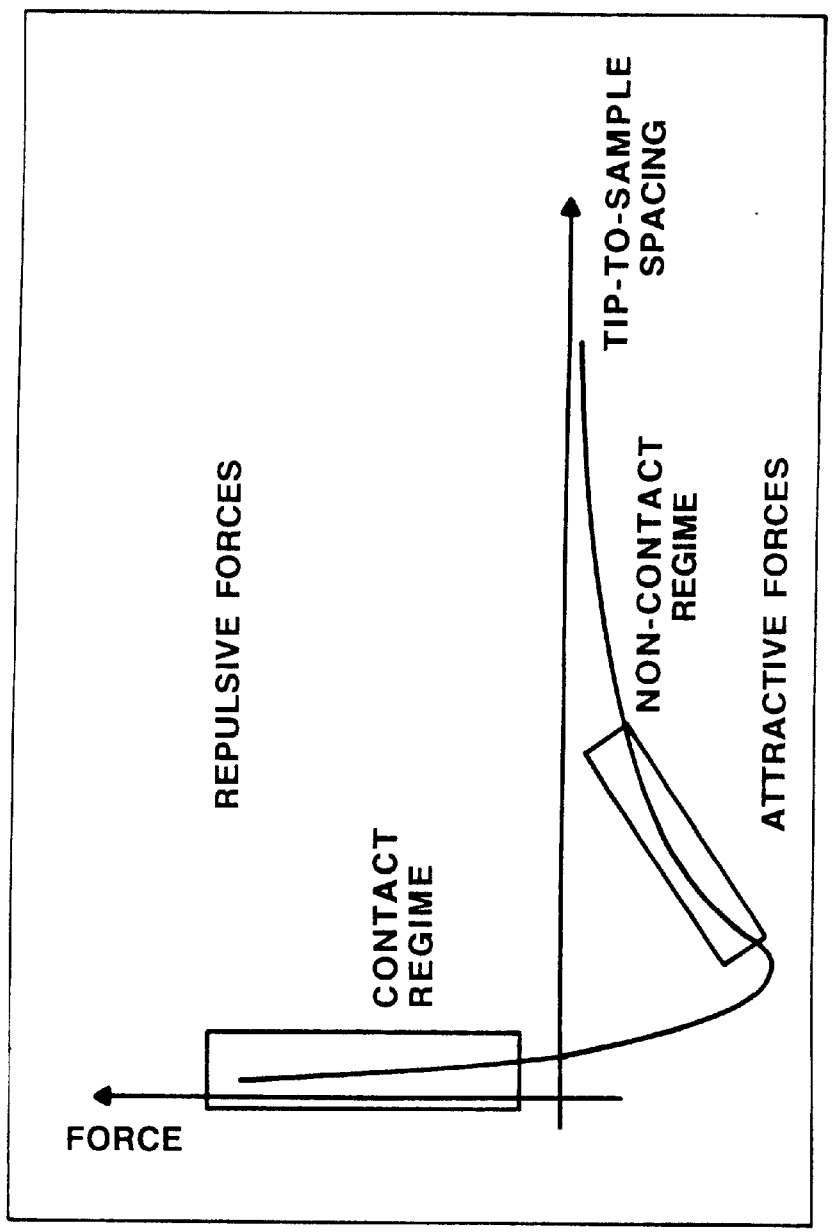
FIG. 1 illustrates the relationship between the force and probe tip to sample distance for both contact and non-contact operation of an atomic force microscope.
Figure 2:
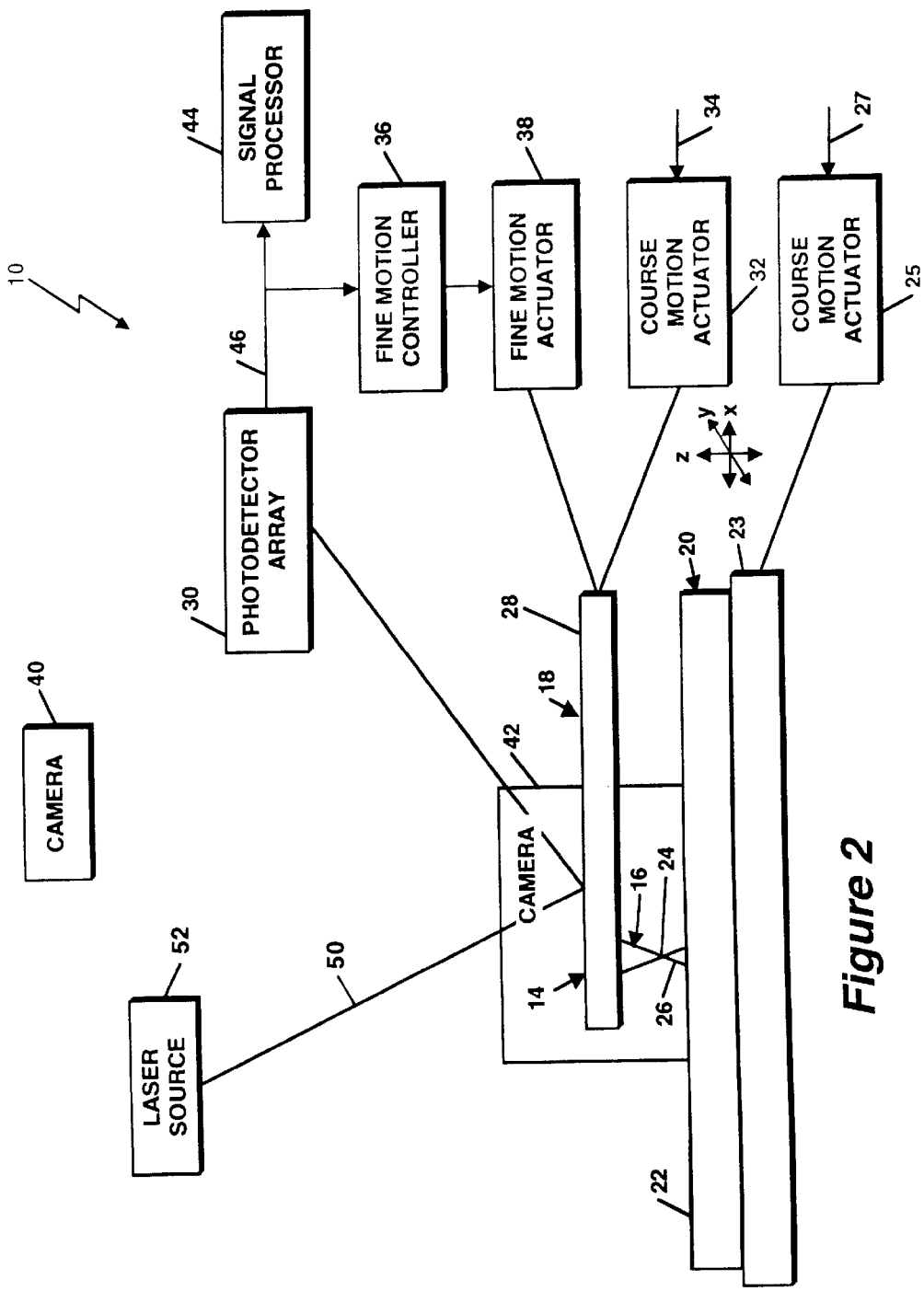
FIG. 2 is a block diagram of a contact atomic force microscope according to the invention.

Referring to FIG. 2, a contact mode atomic force microscope (AFM) 10 includes a probe assembly 14 having a microstylus, or probe 16 mounted to the free end of a cantilever beam 18. The probe 16 has a tip 24 adapted to contact the surface 22 of a sample 20 to be profiled. The sample 20 is supported by a sample holder, or stage 23. The AFM 10 implements improved techniques for bringing the probe into initial contact with a feature 26 of the sample to be profiled. As will become apparent, aspects of the invention are particularly well suited for landing the probe 16 on features 26 having a high aspect ratio.

A typical radius of the probe tip 24 is between 5 nm and 100 nm, a typical length of the probe 16 is on the order of 4.0 µm, and a typical length of the cantilever 18 is between 100 and 200 µm. As will be apparent to those of ordinary skill in the art, portions of commercially available AFMs with customization to the controller can be used to implement in the present invention, such as a 3100 Series AFM from Digital Instruments Co. of Santa Barbara, Calif.

In use, the probe assembly 14 and sample 20 are moved relative to one another, causing the probe tip 24 to move over the sample surface 22. Movement of the probe tip 24 over features, or structures 26 on the sample surface causes the cantilever 18 to deflect. The deflection of the cantilever 18 is measured to provide a measure of the surface topography. More particularly, a laser beam 50 generated by a laser source 52 is directed towards, and reflects off the back surface 28 of the cantilever to impinge upon a sensor, or detector, such as a photodetector array 30. The electrical output signals 46 of the photodetector array 30 provide a topographical image of the sample surface 22.

It will be appreciated by those of ordinary skill in the art that alternatively, the cantilever 18 may be a self-sensing or locally sensing cantilever. A self-sensing cantilever is made of a piezo-resistive material, such that deflection of the cantilever causes a change in resistance that can be measured by applying a constant current and measuring the voltage change. Locally sensing cantilevers integrate a sensor near the cantilever, normally provided in the form of a capacitor.

The detector output signals 46 may be processed by an optional signal processor 44 in order to provide the topographical sample image. Various types of signal processing may be performed, such as deconvolution, as described below in conjunction with FIGS. 8 to 15. Further, the signal processor 44 may process the resulting image itself to perform certain sample measurements, such as measuring the radius of the tip of a feature of the sample, as described in conjunction with FIGS. 17 to 18.

Conventionally, AFM cantilevers are inclined with respect to the sample plane in order to allow for bouncing of the laser beam. However, if the probes are inclined, the probe tip 24 will touch one side of a high aspect ratio structure 26, but possibly not the other side. For this reason, preferably, the sample holder, or stage, is inclined to the same degree as the cantilever so that the probe and sample are normal to one another, as shown.

The AFM 10 operates in a constant force mode. To this end, the detector output signals 46 further provide feedback signals to a fine motion controller 36 which is operable to control, or command a fine motion actuator 38. The fine motion actuator 38 is responsive to control signals from the controller 36 for moving the probe assembly 14 up and down in the Z direction as necessary to maintain a substantially constant force on the probe tip 24 and the sample. The fine motion actuator 38 may take various forms, such as a piezoelectric actuator, and has a typical range in the Z direction on the order of ten micrometers.

Figure 3:
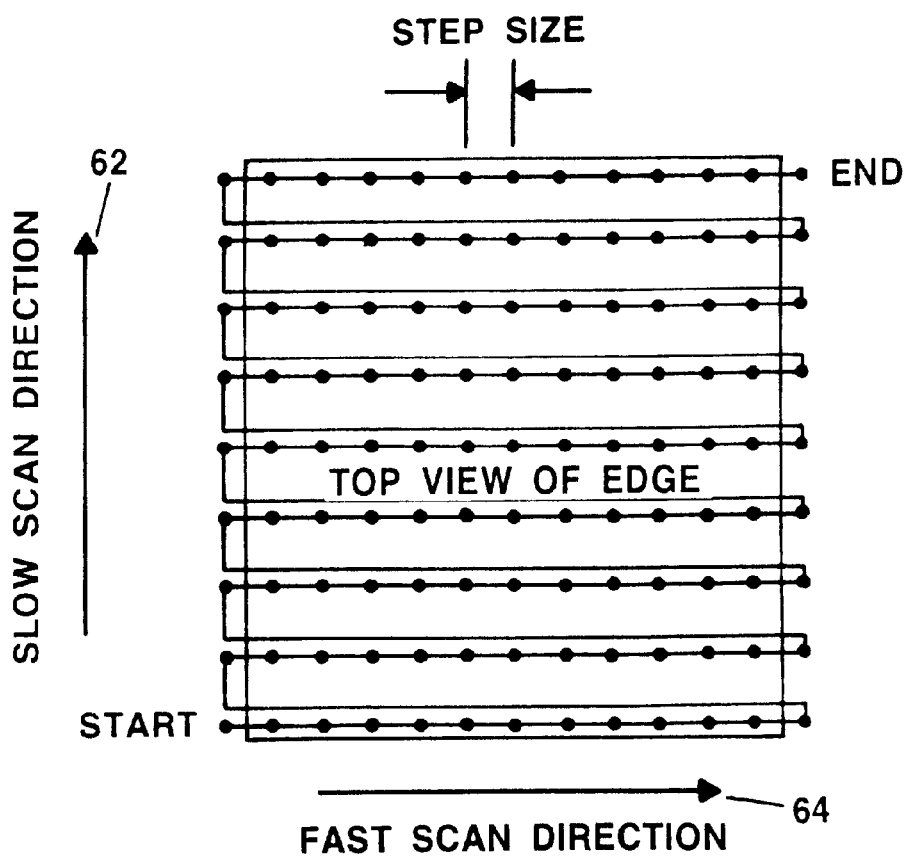
FIG. 3 is a top view of a probe path and sample showing a typical raster scan pattern of the probe.

The fine motion actuator 38 is further operable to move the probe 24 in the X and Y directions over the sample surface 22 in a predetermined scan pattern during image acquisition in response to control signals received from the controller 36. Referring also to FIG. 3, one such scan pattern 60 is shown. The illustrated scan pattern 60 is a raster scan pattern having shorter excursions, or steps, in a slow scan direction (indicated by an arrow 62) and faster steps in a fast scan direction (indicated by an arrow 64). Other scan patterns may be used to optimize the imaging of samples having different characteristics. For example, in applications in which the sample feature to be imaged is characterized by an elongated edge, a line scan pattern may be suitable; whereas, for cone-shaped features, a raster, or grid scan pattern is generally preferable.

AFMs generally include a user controllable coarse motion actuator 32 for moving the probe in the Z direction and a user controllable course motion actuator 25 for moving the stage, or sample holder 23 in X and Y directions. The course motion actuators 25 and 32 may take various forms, such as a stepper motor or voice coil. The actuator 32 typically has a relatively large vertical range, such as on the order of centimeters.

Conventionally, the course motion actuator 25 is used via user input 27 to bring the probe 16 into general vertical alignment with a region of the sample to be profiled and the coarse motion actuator 32 is used to lower the probe 16 into initial contact with the sample surface 22, sometimes with the assistance of a camera, like the illustrated camera 40 positioned above the sample. That is, once the sample is moved such that the probe tip appears through the camera to be vertically aligned with a desired region of the sample, the user actuates (via input 34) the coarse motion actuator 32 to lower the probe 16 into contact with the sample surface 22. However, due to the extremely small radii of both the probe tip and some sample features 26, this technique generally cannot be used to land the probe tip on a high aspect ratio feature to be profiled. Further, in profiling high aspect ratio features, it is necessary to land the probe tip 24 on the feature since, if the probe tip 24 lands at the base of the feature, the fine motion actuator 38 may not have sufficient vertical range to permit the probe tip to reach the peak of the feature. Additionally, causing the probe to "climb" a high aspect ratio structure induces undesirable wear on the probe.

In accordance with aspects of the invention, the fine motion actuator 38 is used in the process of bringing the probe 16 into initial contact with a feature 26 to be profiled, as will be described in conjunction with FIGS. 4–7. Probe landing in accordance with the inventive techniques is achieved generally by performing at least one scanning step with the fine motion actuator prior to bringing the probe 16 into contact with the feature 26.

It will be appreciated by those of ordinary skill in the art that the apparatus shown in FIG. 2 is illustrative only and that other arrangements may be used to practice the claimed techniques and implement the claimed imaging apparatus. For example, the stage 23 may be actuated by a fine motion XYZ actuator and a course motion XY actuator and the probe assembly 14 may be actuated by a simple course motion Z actuator. Thus, although movement of the probe assembly 14 and sample 20 relative to one another will be described herein in connection with the illustrative actuator arrangement shown in FIG. 2, it will be appreciated that the same relative movement can be achieved with other actuator arrangements.

The AFM 10 includes at least one camera 40 positioned in substantial vertical alignment with respect to the sample 20 in order to facilitate probe landing according to the techniques described herein. An optional additional camera 42 may be provided to facilitate the probe landing technique illustrated in FIGS. 6–7. The cameras 40 and 42 may take various forms, such as charge couple device (CCD) digital cameras having magnification lenses. Suitable camera specifications include 1300×magnification, 2 mm field of view, and a 0.05 inch CCD array.

Figure 4:
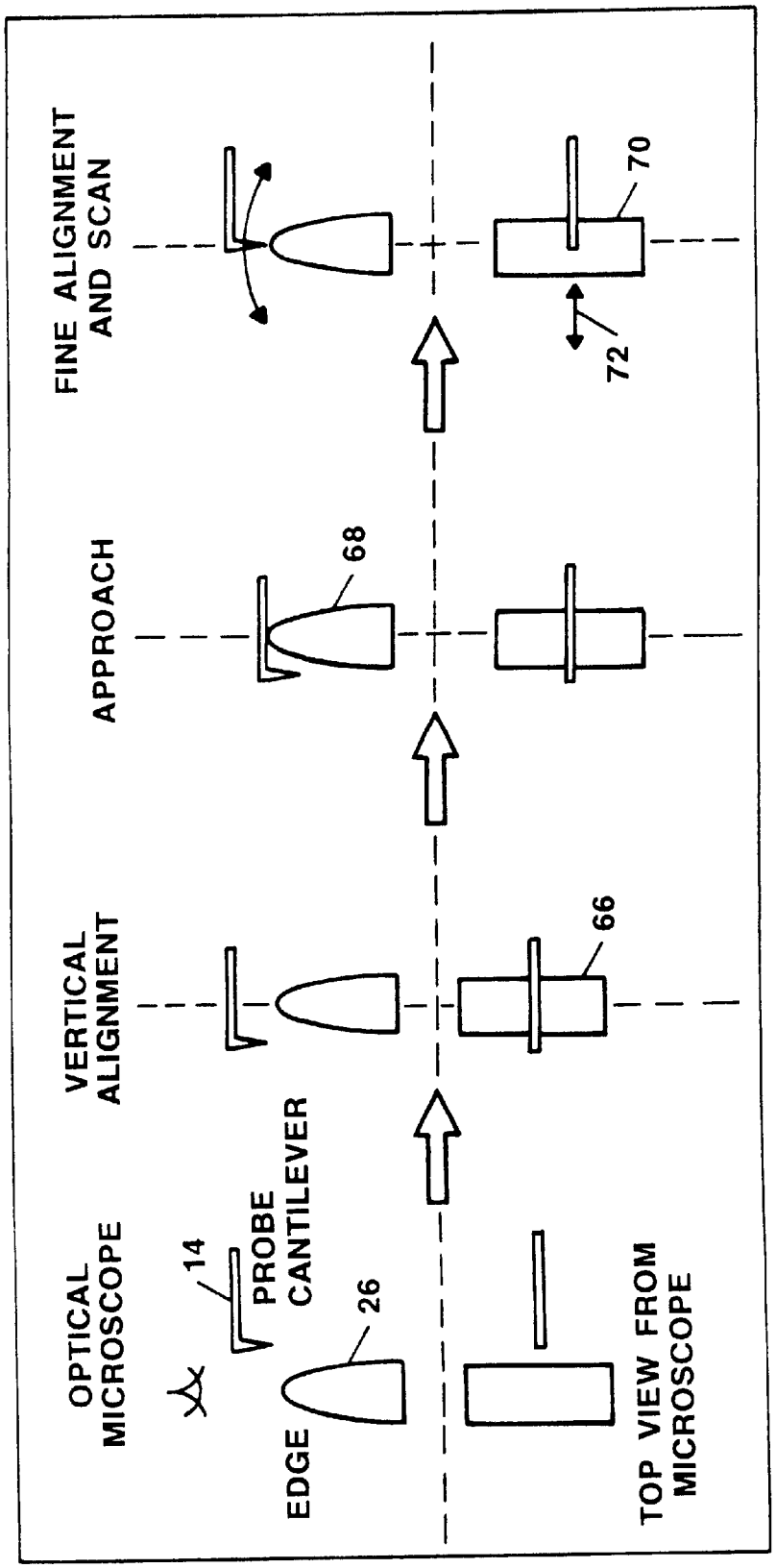
FIG. 4 illustrates a probe landing technique according to one embodiment of the invention.

Referring to FIG. 4, one probe landing technique according to the invention is illustrated. In accordance with this technique, referred to herein as the cantilever landing technique, the cantilever beam 18 is brought into contact with a sample feature 26 to be profiled. Initially, the sample feature 26 and probe assembly 14 are moved relative to one another so that the probe tip is in close proximity to the sample feature, with the elongated axis of the cantilever 18 intersecting the sample feature as shown in the top view labelled 66 (i.e., intersecting vertical alignment). The camera 40 is used to visualize the feature 26 and the cantilever to enable the user to move the cantilever and sample relative to one another into such intersecting vertical alignment.

The focus depth of the camera 40 may not be large enough to permit visualization of the cantilever and sample feature at the same time. Thus, it may be necessary to first focus on either the cantilever or the sample and mark (e.g., with a cursor in the camera's field of view) the location of the visualized structure and then focus on the other one of the sample and cantilever in order to determine the relative location of the two.

Alternatively, locating the cantilever and sample relative to each other may be automated. That is, by using a vision pattern recognition system, the cantilever and sample can be localized in the field of view of the vision system. Then the coordinates of the cantilever and sample can be rewritten in terms of the coordinates of the stage frame.

Once the cantilever and sample feature are moved into intersecting vertical alignment, the user lowers the probe assembly 14 with the course motion actuator 32 until the cantilever 18 contacts the sample feature, as shown in the side view labelled 68. Contact is detected once the cantilever 18 bends, thereby causing the laser beam 50 to be deflected.

The probe assembly 14 is then moved by the fine motion actuator 38 in a desired scan pattern back towards the sample feature 26. As one example shown in the view labelled 70, the feature 26 is characterized by an elongated edge and the probe is moved in a line scan pattern along the axis of the cantilever (along an axis labelled 72). The line scan pattern may alternatively be orthogonal to the axis 72. Contact of the probe 16 with the feature 26 causes the cantilever 18 to bend. Such deflection prompts the controller 36 to activate the fine motion actuator 38 to raise the probe assembly 14 by an amount on the order of the length of the probe 16, so that the probe tip 24 will "minimally" engage the apex region of the feature, thereby resulting in gentle contact of the probe tip with the feature.

Figure 5:
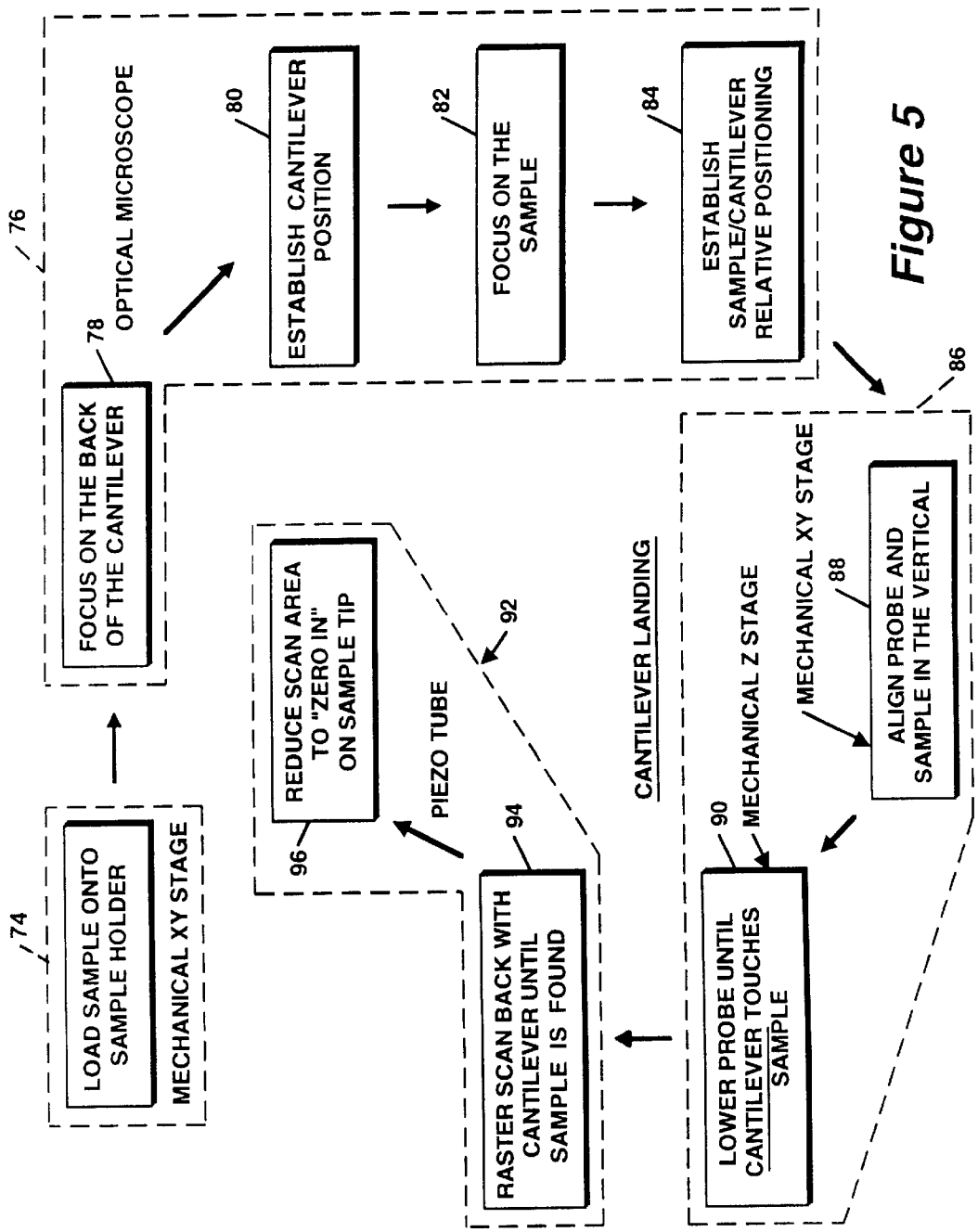
FIG. 5 is a flow diagram of the probe landing technique of FIG. 4.

Referring also to the flow diagram of FIG. 5, the cantilever landing technique commences at step 74 with the sample being loaded onto a sample holder 23. Again, the sample holder may take various forms, such as the simple XY platform 23 of FIG. 2.

Thereafter, the probe assembly 14 and sample are moved relative to one another until the probe tip 24 is in close proximity to the feature 26 to be profiled, with the cantilever in intersecting vertical alignment with the feature. This is achieved by visualizing the probe assembly 14 and feature 26 with the camera 40 functioning as an optical microscope as labelled 76. Depending on the camera characteristics, such as depth of focus, the visualization may require multiple steps. In particular, and as noted above, in cases in which the camera depth of focus is too small for the cantilever 18 and the feature 26 to be visualized at the same time, the elements are viewed one at a time. For example, the camera is focussed on the back of the cantilever 18 in step 78 and the position of the cantilever is established (e.g. by marking the position of the cantilever with a cursor in the camera's field of view) in step 80. Thereafter, the feature 26 is brought into focus in step 82 and its position relative to the cantilever is visually determined in step 84.

In step 88, the cantilever 18 and the feature 26 are brought into intersecting vertical alignment. Movement of the sample and/or probe to achieve the desired intersecting vertical alignment is generally achieved with the XY stage 23 which supports the sample.

In step 90, the probe assembly 14 is lowered by the coarse motion actuator 32 until the cantilever 18 contacts the feature 26. Once deflection of the reflected laser beam 50 is detected, it is determined that contact has been made.

Thereafter, the probe 16 is moved in a scanning pattern in order to locate the feature in step 94. In particular, the probe is moved in a predetermined scanning pattern by the fine motion actuator 38 under the control of the controller 36 until the probe 16 contacts the feature. Possible scan patterns that may be used include raster and line scan patterns. Also in step 94, once deflection of the cantilever 18 indicates that the probe 16 has contacted the feature 26, the fine motion actuator 38 raises the probe assembly 14 slightly, so that minimal, gentle engagement of the probe tip 24 with the apex region of the feature is achieved.

The feature locating scan pattern will normally span a relatively large search area so as to maximize the chances of the probe eventually contacting the feature. Once probe contact is made with the feature and minimal engagement of the probe tip with the feature is achieved, the scan area can be reduced so as to include only the area of interest in the subsequent image acquisition scanning. The probe 24 is then moved in a scanning pattern by the fine motion actuator 38 in response to control signals received by the controller 36 in order to generate a topographical image of the feature.

The above-described cantilever landing technique eliminates the problems associated with the probe tip landing at the base of a feature to be profiled, as opposed to landing on the feature itself Also, this technique is very robust since the probe assembly is brought into contact with the feature such that the feature contacts any point along the cantilever length. However, landing the cantilever on the feature can cause the cantilever to break or damage the sample. Further, this technique is generally applicable only to high aspect ratio samples. This is because low aspect ratio samples do not have features that could contact the cantilever before the probe touches the base surface of the sample.

Figure 6:
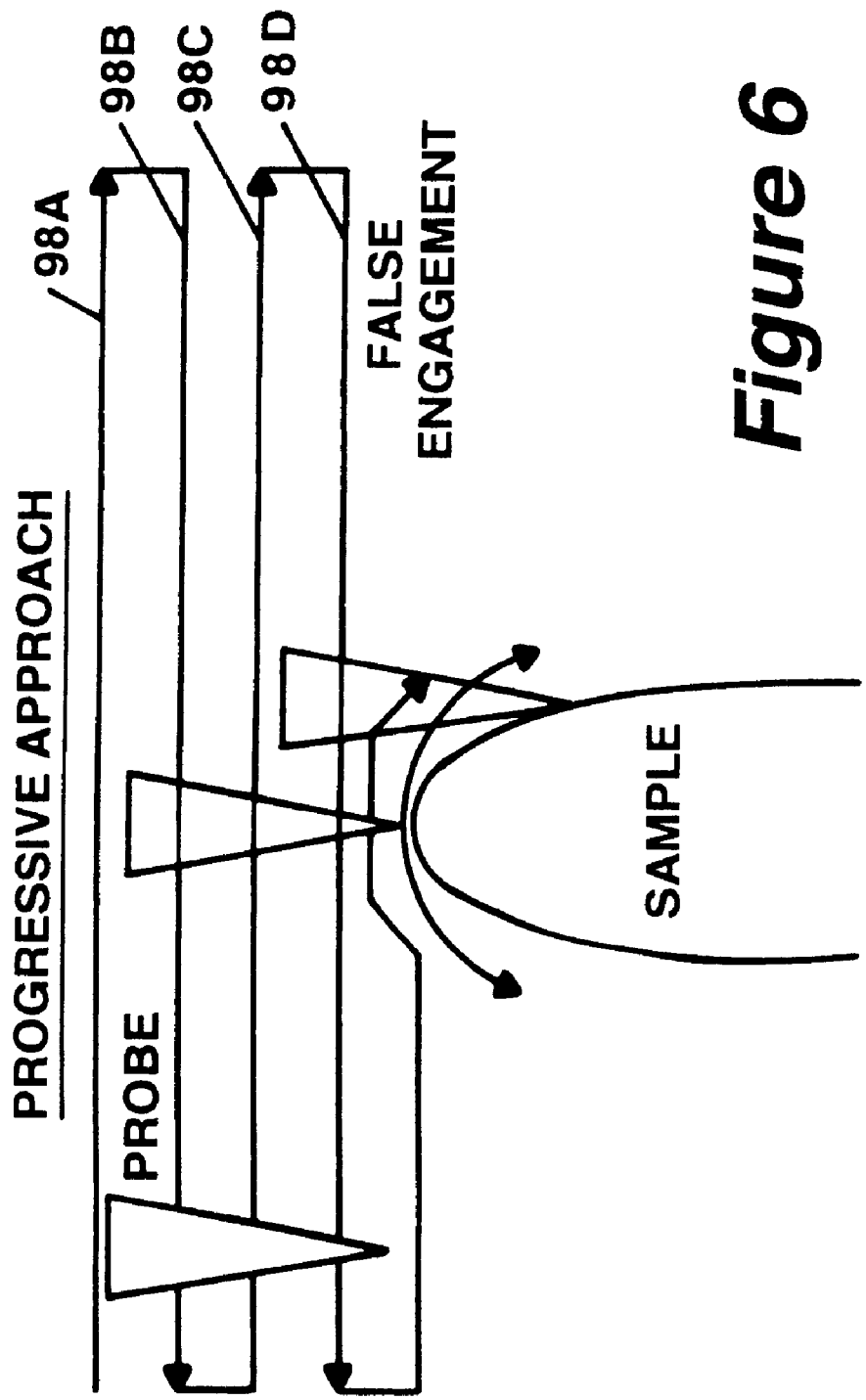
FIG. 6 illustrates an alternative probe landing technique according to a further embodiment of the invention.

Referring to FIG. 6, an alternative probe landing technique, referred to as the progressive approach and engagement technique, is illustrated. In accordance with this technique, the probe tip 24 is brought into close proximity with the feature 26 and the probe is scanned in air (referred to as "false engagement") in progressively lower horizontal planes (represented by horizontal lines 98A–98D) until the probe, and preferably the tip of the probe, contacts the feature 26 to be profiled.

More particularly, the probe and sample feature are visualized in an effort to bring the probe tip into relatively close proximity to the feature. In the illustrated example of FIG. 6, such proximity is represented by the distance between planes 98A and 98D. The probe is then commanded to scan in a predetermined pattern, such as a raster scan pattern, in air in a first horizontal plane 98A. Since probe contact with the feature is not detected during the scan in plane 98A, the probe assembly 14 is lowered to a second horizontal plane 98B and is scanned again. This process (of scanning, detecting any contact with the feature, and if no such contact is detected, lowering the probe assembly, and repeating the scanning and detecting steps) is repeated until the feature is located with the probe.

The distance between horizontal planes 98A–98D is chosen by the user. Small distances will result in several repetitions of the above-described scanning process. Larger distances however may cause the probe to initially contact the sample at a point far from the probe apex, thereby increasing the risk of damage to the probe. Preferably, the distance between scanning planes is relatively small in order to cause the probe tip to make initial contact with the sample in a gentle manner (i.e., to minimally engage the sample).

Figure 7:
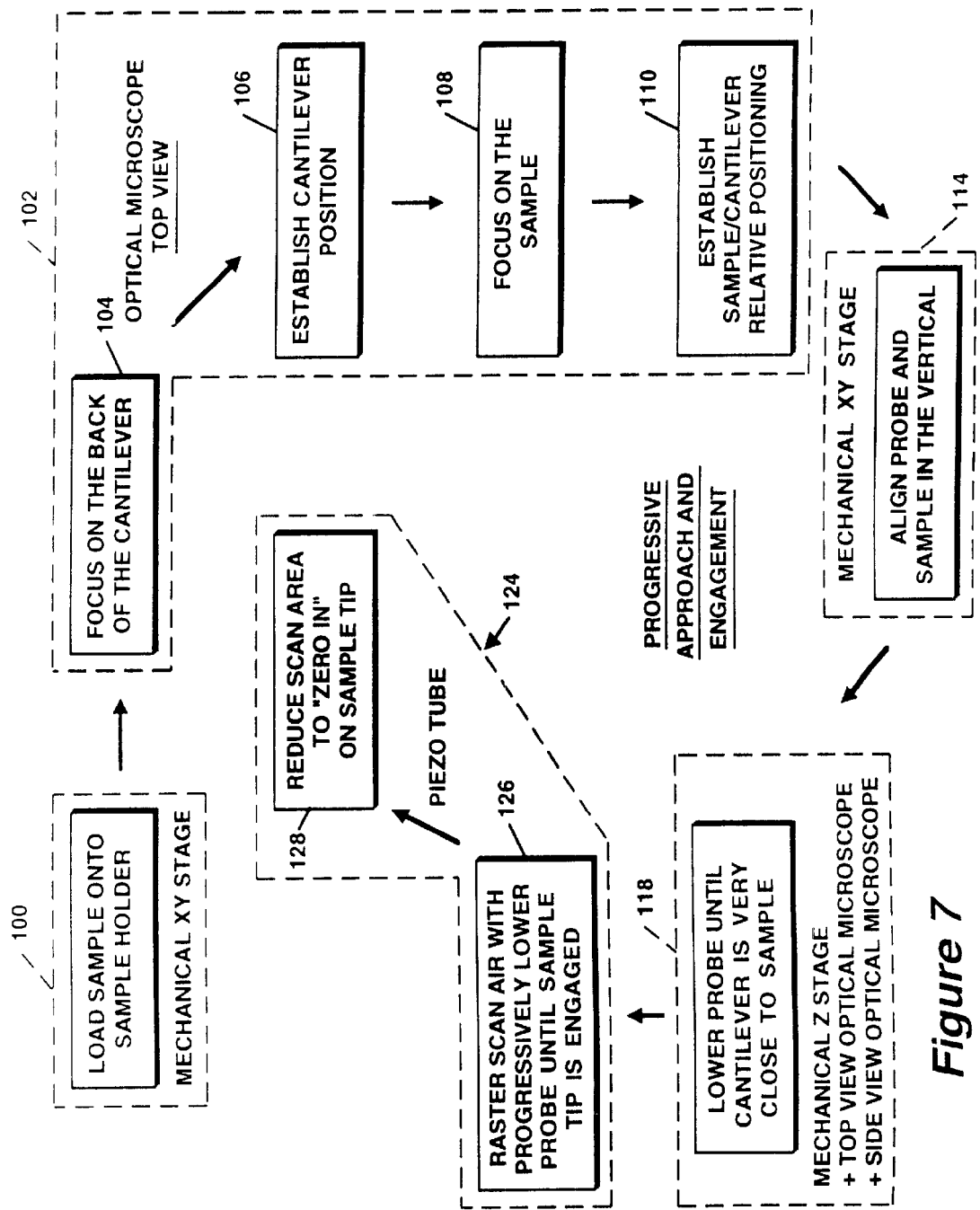
FIG. 7 is a flow diagram of the probe landing technique of FIG. 6.

Referring also to the flow diagram of FIG. 7, the progressive approach and engagement technique commences at step 100 with the sample being loaded onto a sample holder, such as the XY stage 23 of FIG. 2. As in the cantilever landing technique, an effort is made through camera visualization to vertically and horizontally align the probe tip 24 with the feature 26. However, since the present technique does not rely on cantilever contact with the feature as a way to help locate the feature, even more precise camera visualization is desirable. To this end, an AFM performing the progressive approach and engagement technique is preferably equipped with lateral camera 42 (FIG. 2) as well as the vertical camera 40.

The vertical camera 40 is used in an effort to vertically align the probe tip 24 and sample 26. Thus, steps 104—110 of FIG. 7 are substantially identical to steps 78–84 of FIG. 5. In step 114, the probe and sample are moved relative to one another while viewing the probe and sample with the vertical camera 40 until the probe tip 24 is vertically aligned with the feature to the extent possible given the camera resolution. In the illustrative embodiment, this alignment is achieved by moving the XY stage 23 holding the sample.

Once such vertical alignment between the probe tip 24 and the feature 26 is achieved, the lateral camera 42 is used to obtain a side view of the probe tip 24 and feature 26. More particularly, in step 118, while viewing the probe and sample with the lateral camera 42, the user actuates the coarse motion actuator 32 in an effort to bring the probe tip as close to the feature as possible. The probe tip and feature are brought closer and closer together until the lateral view does not have enough resolution to ensure positive separation. The top view is then used to assess the spacing. More particularly, since the camera 40 providing the top view has a relatively small depth of field, when probe and feature can be seen on the same frame, they are only micrometers apart, such as on the order of 5 micrometers apart. Thus, movement of the probe and/or feature until they can be viewed in the same frame with camera 40 ensures that they are on the order of 5 micrometers apart.

Once the probe tip 24 and sample feature 26 are moved into close proximity using the above described visualization technique, false engagement of the probe is performed in step 126. As noted above, false engagement refers to scanning the probe in a predetermined scan pattern in air, determining if contact was made with the sample feature during the scan, lowering the probe with the fine motion actuator 38 in the event that no such contact was made, and repeating these steps until such contact is made. Various scan patterns are possible, such as a raster scan or a line scan pattern. If the distance between horizontal scan planes is kept small, such as on the order of 0.51 µm or less, then initial contact with the feature will be by the probe tip.

Once the probe tip 24 is brought into contact with the feature 26 in this manner, the scan area (i.e., size of the scan pattern) is reduced in order to "zero in" on the feature for image acquisition in step 128. The probe 24 is then moved in a scanning pattern to generate a topographical image of the feature.

Like the cantilever landing technique, the progressive approach and engagement technique eliminates problems associated with landing the probe tip at the base of a high aspect ratio feature to be profiled. Further, this technique advantageously does not require the probe to land until the feature is located under the probe tip. Also, this approach has applicability to all types of sample features to be profiled since its benefits are not confined to high aspect ratio samples. With the progressive approach, the probe first touches the tall parts of the sample. Small approach steps ensure minimal engagement. Therefore, this method can be used to minimize the possibility of damaging the sample surface and the microstylus by providing a gentle first contact.

Figure 8:
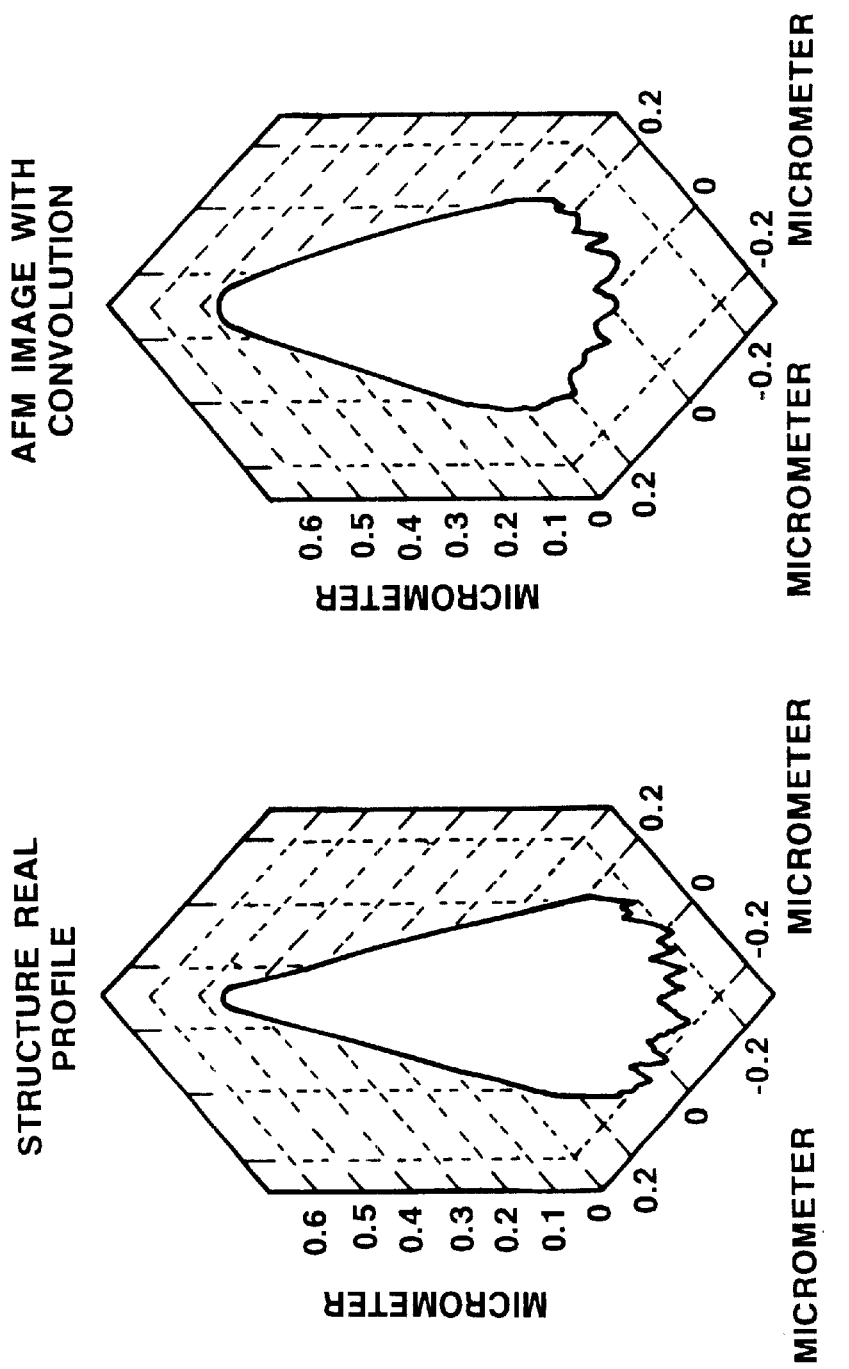
FIG. 8 illustrates the effects convolution between the probe and sample.

The lateral resolution of the AFM 10 is dictated by the size of the probe tip 24, the slope of the sample surface irregularities and the included angle of the microstylus. The effects of the finite probe size on the image formation of samples having a radius of curvature on the same order of magnitude as the size of the probe tip 24 (e.g., tens of nanometers) are shown in FIG. 8, as reported by J. E. Griffith, D. A. Grigg, M. J. Vasile, P. E. Russell and E. A. Fitzgerald in "Characterization of scanning microscopic tips for line width measurement," J. Vac. Sci. Technol. B, 9 3586–3589.

Figure 9:
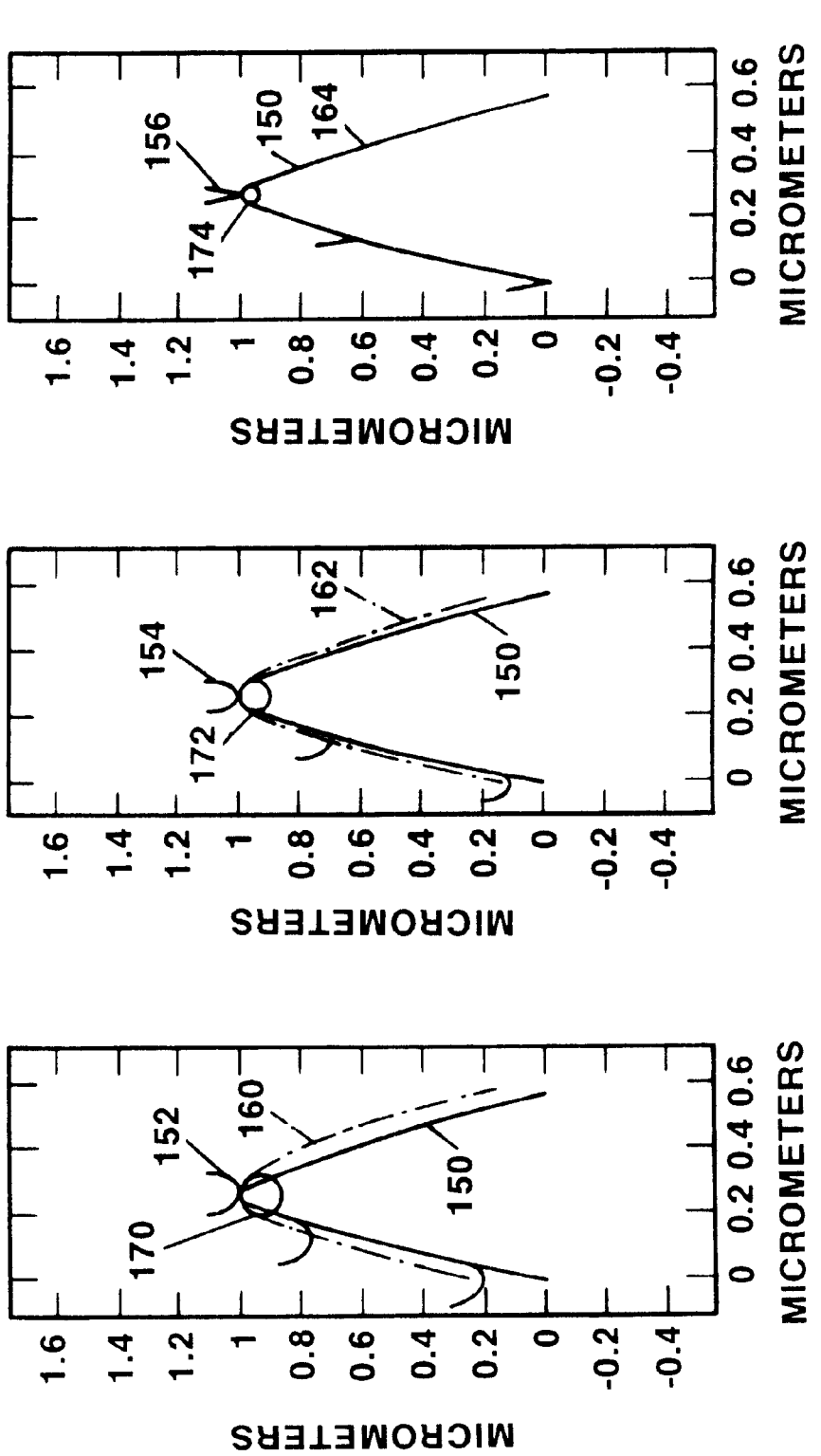
FIG. 9 illustrates the effects of finite probe size on image geometry and radius measurements.

Referring to FIG. 9, a simulation of imaging the same feature 150 using three different probes 152, 154, and 156 having different radii of curvature is shown. Note that the smaller the radius of the probes 152, 154, and 156, the narrower the resulting image 160, 162, and 164, respectively, as compared to the actual profile of the feature 150. However, although qualitatively the images 160, 162, and 164 are not very different (at least visually), the resulting radius of the sample image (obtained by fitting a circle 170, 172, and 174, respectively, to the image apex) varies substantially.

In order to recover the real sample profile, the probe geometry information contained in the image of the sample must be filtered out (i.e., the image must be deconvolved). To achieve that, the probe shape must be known, that is, the probe must be characterized. One conventional way to obtain the probe shape is by inspection under a Scanning Electron Microscope (SEM), but this approach requires that the probe has to be frequently removed from the profilometer which is impractical.

Another conventional technique to characterize the probe is via the scanning of a "step" as described by J. E. Griffith and D. A. Grigg in "Dimensional metrology with scanning probe microscopes," J. Appl. Phys., 74 (9), Nov. 1, 1993, and D. Keller in "Reconstruction of STM and AFM images distorted by finite-size tips," Surface Science, 253 (1991) 353–364. The sides of the image of a step scanned with a certain probe reflect the probe shape. However, it is difficult to obtain a perfectly flat and square step. Further, experimental extraction of the probe shape from the step image is subjective, as is illustrated in FIG. 10.

Figure 10:
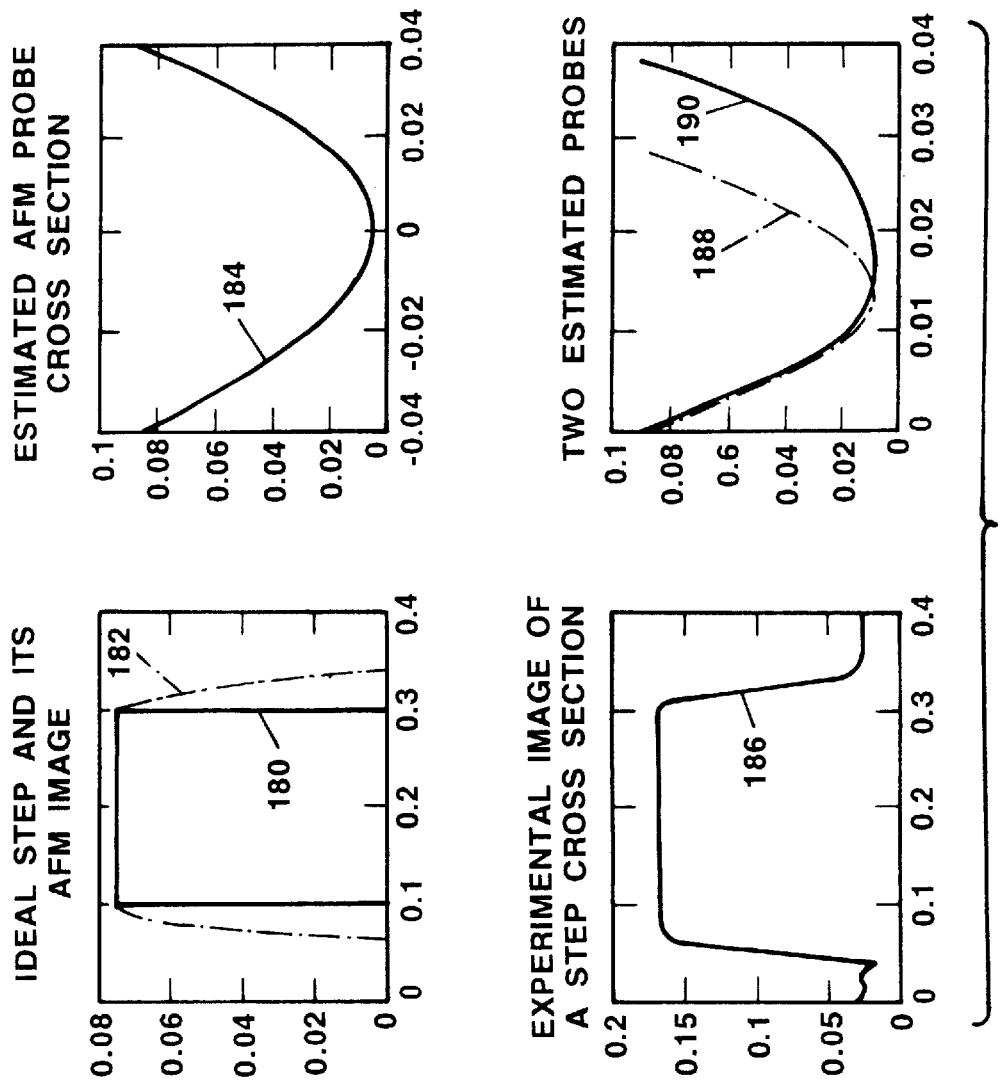
FIG. 10 illustrates the conventional use of imaging a step to extract probe shape information.
Figure 11:
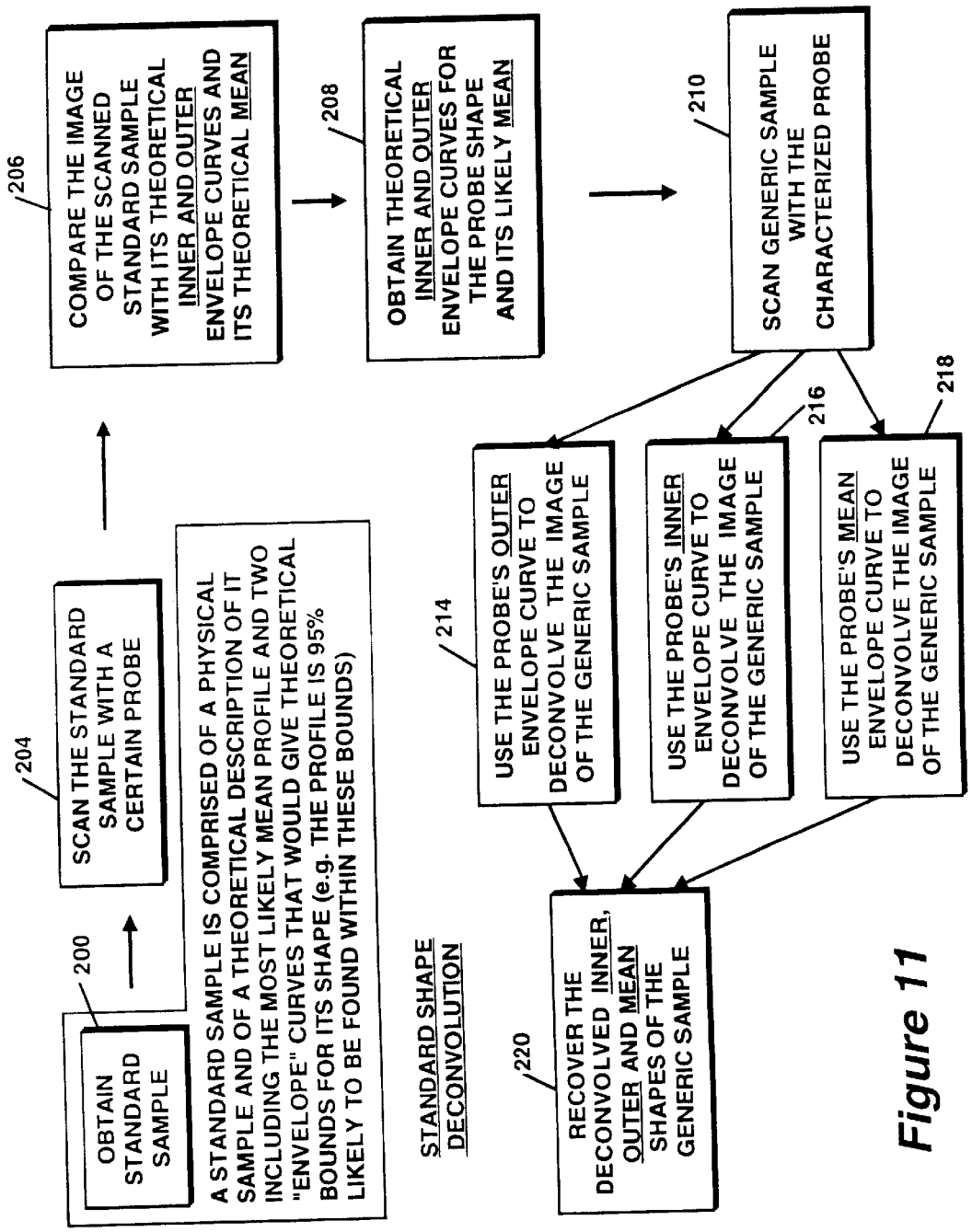
FIG. 11 is a flow diagram illustrating the standard sample deconvolution technique according to a further aspect of the invention.
Figure 12:
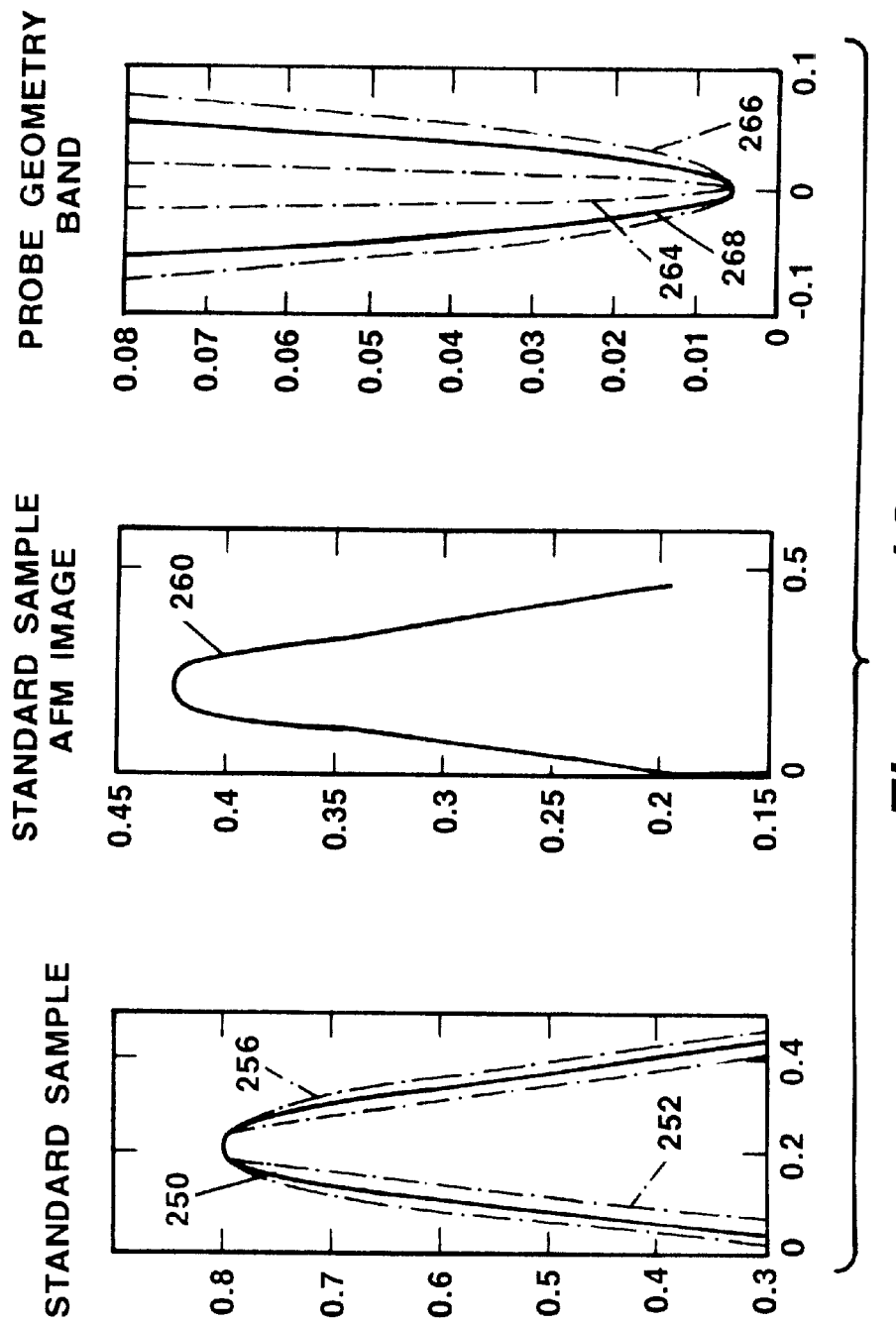
FIG. 12 illustrates the probe characterization of the method of FIG. 11.

Referring to FIG. 10, a perfect step 180 which is scanned provides an image 182 which can be used to estimate the probe shape 184. However, when a real step is profiled and its experimental image obtained 186, it is very hard to define the image side and the possible effects of corner roundness since the step may or may not have square angles. Thus, two very different possible probe shapes 188 and 190 are obtained from the same image.

According to a further aspect of the invention, a standard sample based deconvolution approach is provided. Referring to the flow diagram of FIG. 11 and to FIG. 12, in step 200, a standard sample is obtained. A standard sample is a physical sample having a theoretical description including a most likely mean profile 250 (FIG. 12) and two "envelope" curves 252, 256 that provide theoretical bounds for its shape (i.e., limits within which the real probe shape is expected to be).

In step 204, the standard sample is scanned with the AFM 10 and its image 260 (FIG. 12) provided. In step 206, the image 260 is compared with the theoretical envelope curves 252, 256 and the theoretical mean 250. The result of this comparison provided in step 208 is a theoretical inner envelope curve 264 for the probe shape, a theoretical outer envelope curve 266 for the probe shape, and the most likely mean 268 of the probe shape.

Figure 13:
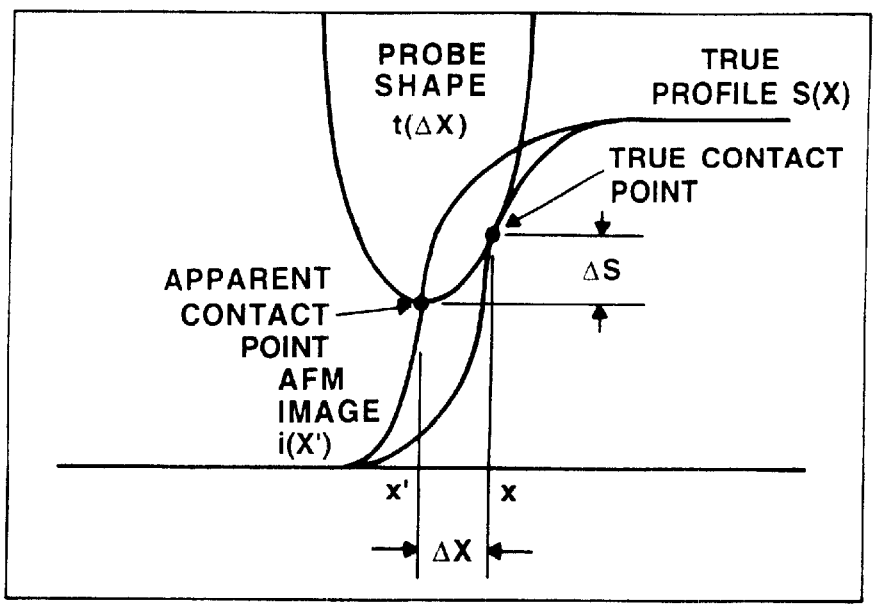
FIG. 13 illustrates the geometrical aspects of probe and sample contact.

More particularly, in order to provide the theoretical curves 264, 266, and 268 for the probe shape, the AFM image 260 of the probe is aligned with one of the theoretical curves 250, 252, 256 of the standard sample (e.g., by aligning a similar feature, such as the apex). The slope of the image 260 is then calculated at a selected point and the point on the theoretical curve having the same slope is determined. A vertical displacement ($\Delta X$) and a horizontal displacement ($\Delta S$) between the image 260 and the theoretical curve are determined and the above steps are then repeated for each point on the image 260. Note that such horizontal displacement $\Delta X$ and vertical displacement $\Delta S$ between an AFM image and a true profile are shown in FIG. 13. In the case of process steps 206 and 208, s(x) is the true probe shape and i(x') is the AFM image 260 of the probe. A plot of all $\Delta X$, $\Delta S$ pairs (i.e., a plot of $\Delta S$ as a function of $\Delta X$) provides the shape of the probe. This process is then repeated for the other theoretical curves of the standard sample in order to provide the theoretical curves 264, 266, and 268 for the probe shape.

Figure 15:
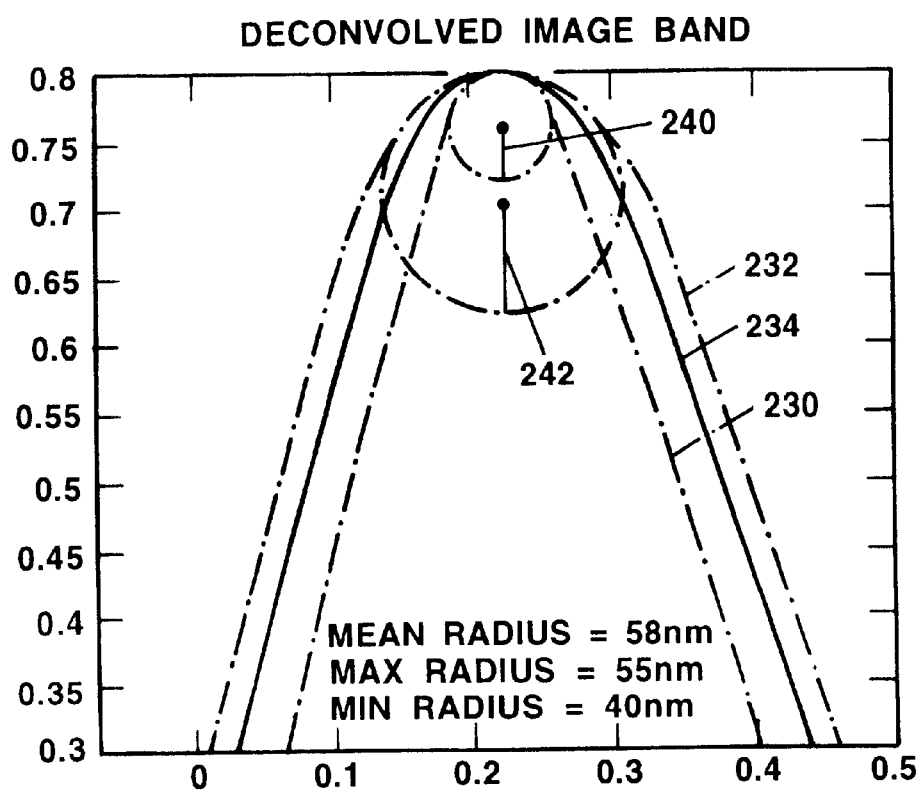
FIG. 15 demonstrates image deconvolution according to the method of FIG. 11.

The probe characterization, or tip reconstruction provided in step 208 can then be used to deconvolve images of actual samples. In step 210, a generic sample is scanned with the characterized probe. In subsequent step 214, the probe's outer envelope curve 266 is used to deconvolve the image of the generic sample to provide a deconvolved outer curve 232 of the generic sample (FIG. 15). Similarly, in step 216, the probe's inner envelope curve 264 (FIG. 12) is used to deconvolve the image of the generic sample to provide a deconvolved inner curve 230 of the generic sample (FIG. 15) and in step 218, the probe's mean curve 268 (FIG. 12) is used to deconvolve the image of the generic sample to provide a deconvolved mean curve 234 (FIG. 15).

Figure 14:
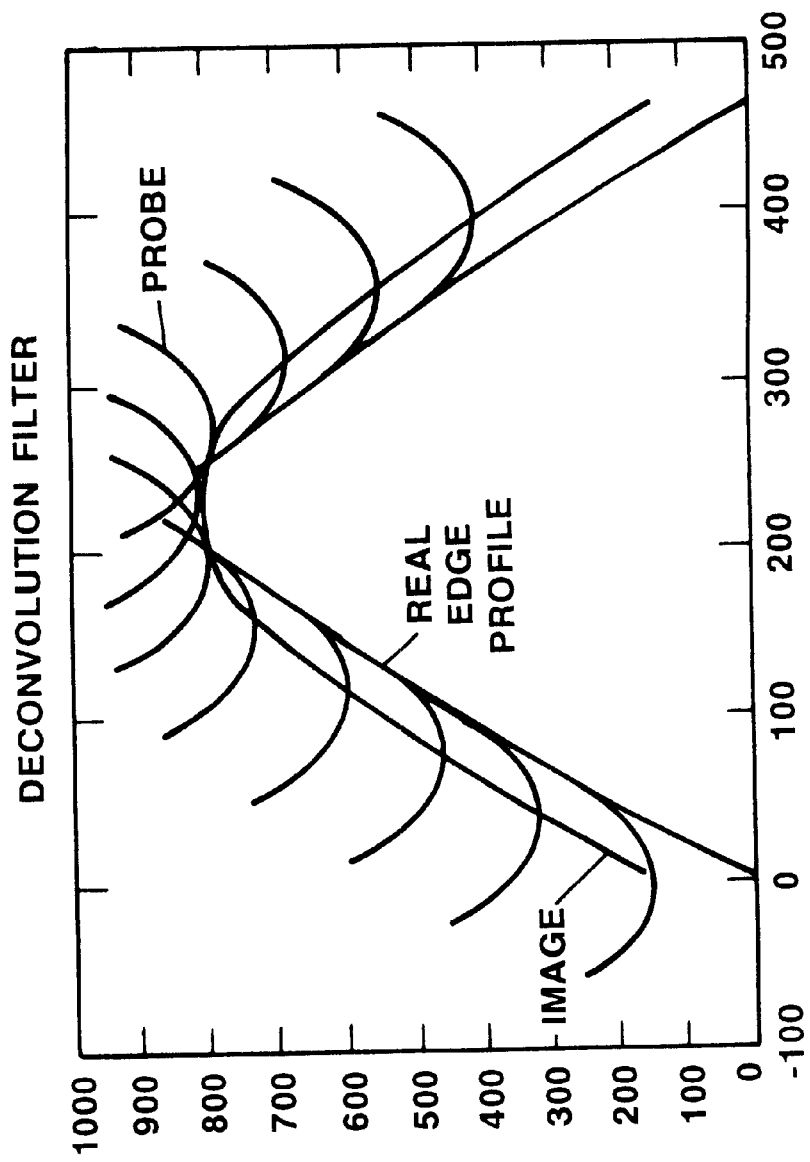
FIG. 14 illustrates image deconvolution of a high aspect ratio structure.

More particularly, referring also to FIGS. 13 and 14, deconvolution of the image from the probe's curves requires two quantities: (1) The horizontal distance between the true contact point and the apparent contact point, i.e., the tip of the probe ($\Delta x$). (2) The vertical distance between the true contact point and the ultimate probe tip must also be known ($\Delta s$). At the point of contact, the probe and the real profile have the same slope since they are tangent with respect to each other. In addition, the slope of the apparent image, traced by the probe tip, also has the same slope as both the probe and the surface at the true contact point. To demonstrate that, we use the same notation of as D. Keller, "Reconstruction of STM and AFM Images Distorted by Finite-size Tips," Surface Science, 253 (1991) 353–364.

s(x) is the true sample profile.

i(x') is the apparent image traced by the probe tip end, which is the image provided by the AFM.

x is the location of the contact point.

x' is the location of the probe tip.

$\Delta x$ is the lateral distance between the probe tip (x') and the contact point (x).

$\Delta s$ is the vertical distance between x and x'.

t($\Delta x$) is the shape of the probe.

Since s(x) and t ($\Delta x$) have the same slope at the contact point, one can write:

$$\frac{dt}{d(\Delta x)}(\Delta x) = \frac{ds}{dx}(x) \tag{1}$$

As the probe moves, x' moves together and $\Delta x$ will also change. Therefore:

$$\Delta x = \Delta x(x') \tag{2}$$

And since $\Delta x$ is the lateral distance between the apparent and true contact points, and $\Delta s$ is the vertical distance, it results that:

$$x = x' + \Delta x(x') \tag{3a}$$

$$s(x) = i(x') + \Delta s(x') \tag{3b}$$

Also note that Δs(x') is equal to the value of the probe shape function t(Δx) evaluated at the contact point.

$$\Delta s(x') = t[\Delta x(x')] \qquad (4)$$

Taking the derivative of equation (2), we find that:

$$\frac{dx}{dx'} = 1 + \frac{d(\Delta x)}{dx'}(x') \qquad (5)$$

From equations (1), (3b) and (4), one can write:

$$\frac{di}{dx'}(x') = \frac{ds}{dx}(x)\frac{dx}{dx'} - \frac{dt}{d(\Delta x)}(\Delta x)\frac{d(\Delta x)}{dx}(x') \qquad (6)$$
$$= \frac{ds}{dx}(x)\left[\frac{dx}{dx'} - \frac{d(\Delta x)}{dx'}(x')\right] = \frac{ds}{dx}(x)$$

In equation (6), it is implied that the slope of the AFM image at x' is the same as that of the real surface at x.

With results (1) and (6), we can state that:

$$\frac{dt}{d(\Delta x)} = \frac{di}{dx'}(x') \qquad (7)$$

With the result in equation (7), the image reconstruction is possible. For each point in the AFM image, the image slope is evaluated. Then comparing this slope to the slopes of the probe shape (provided by the theoretical inner envelope curve 264 for the probe shape, the theoretical outer envelope curve 266 for the probe shape, and the most likely mean 268 for the probe shape), we can find the point x where equation (7) is true (i.e. the two slopes are equal). With x, we can evaluate the value of the quantities Δx (from x–x') and Δs (from t(Δx)), thereby providing the deconvolved outer curve 232 (FIG. 15) of the generic sample, the deconvolved inner curve 230 of the generic sample, and the deconvolved mean curve 234 for the generic sample.

A simulation result of the deconvolution procedure is shown in FIG. 14. An "edge-like" profile is scanned using a finite size tip. Note that AFM image departs from the real profile. The deconvolution based on the probe shape knowledge corrects the image, as shown.

The resulting curves 230 and 232 (FIG. 15) represent the limits within which the final expected sample profile will be because of the uncertainty associated with the shape of the standard sample used to characterize the probe. Different radii 240, 242 can be fitted to the inner and outer limits 230, 232, respectively, as well as the most likely sample profile 234. The thinner the profile band for the standard sample, the more precise the probe characterization and the more precise the deconvolved sample image (thus inducing a smaller radius spread). It will be appreciated by those of skill in the art that, for samples having a predetermined minimum tip radius, such as 50 nm, deconvolution may be unnecessary.

With the above-described deconvolution technique, a "relatively known" sample is used to characterize the probe, rather than using an arbitrary step to characterize to probe. This technique is very effective when the sample shape has a strong correlation with the manufacturing parameters that were used to produce it (i.e., when a certain set of parameters would yield a certain probe shape to within a certain statistical spread). Therefore, an expected probe shape can be extracted from the image generated by the scanning of a standard sample.

Figure 16:
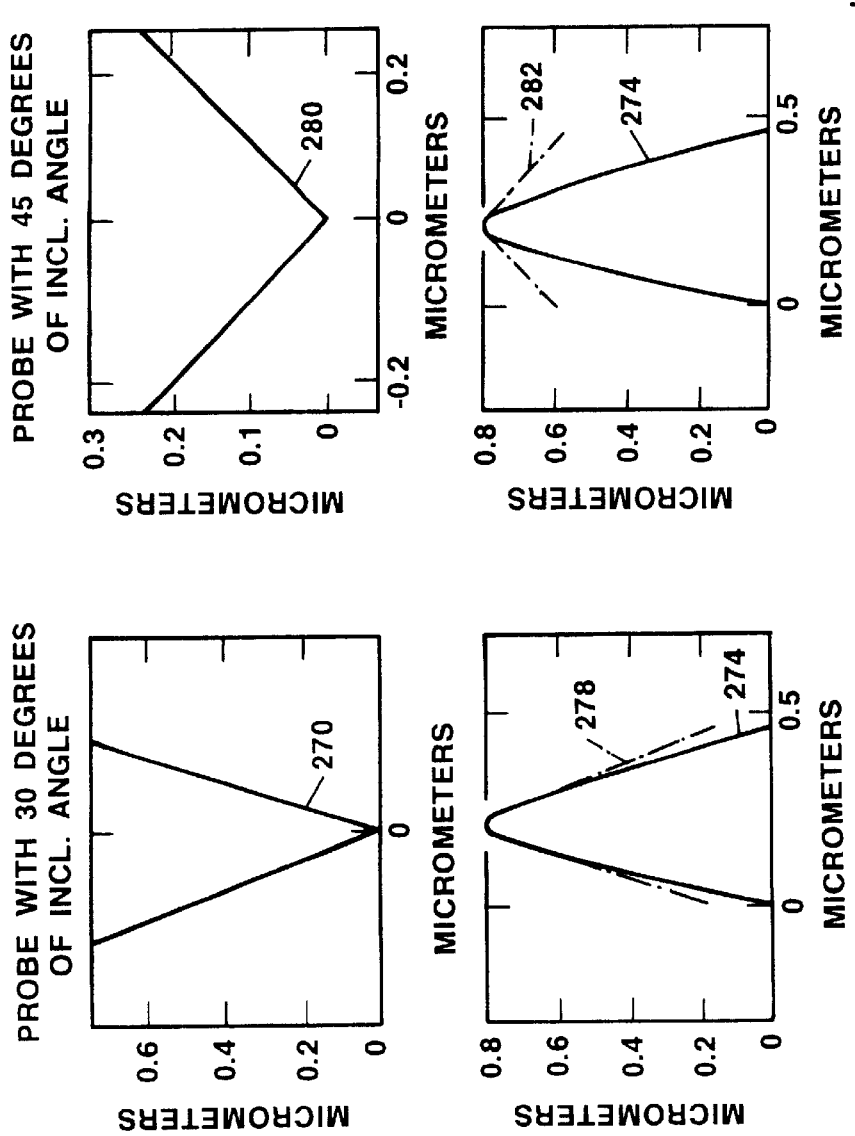
FIG. 16 illustrates the effect of the included angle of the probe on image generation.

Depending on the relative geometry of the sample and the probe, some regions on the sample might be inaccessible. The topography of those regions cannot be recovered through deconvolution since the image stores no information about them. One factor that reduces the accessibility of the probe to the various regions on the samples is its included angle. Large probe included angles make it impossible to scan the side walls of the structures. Referring to FIG. 16, an imaginary sharp probe 270 that is used to scan an imaginary sample 274 generates its image 278; whereas, an obtuse probe 280 generates an image 282 which does not follow the profile because the probe tip cannot touch the side walls of the sample. Note that the slope of the image reflects the probe included angle. Although one solution is to use sharper probes, these are more prone to failure and shape changes and, as is evident from FIG. 16, AFM images are very sensitive to probe geometrical changes.

In selecting scanning speeds (scan rate in lines per second), certain considerations are taken into account. Faster scan speeds tend flatten the topography and details may be lost due to the inability of the servo system to track the fast changing surface. In order to enhance the response at high speeds, the gain of the controller 36 may be increased, but this can lead to high frequency noise due to the excitation of lightly dampened vibration modes. To optimize the performance of the AFM 10 in view of these issues, the AFM is preferably operated at relatively moderate speeds, on the order of one line per second (i.e., 1 Hz), and with relatively low controller gain, on the order of 0.1.

Figure 17:
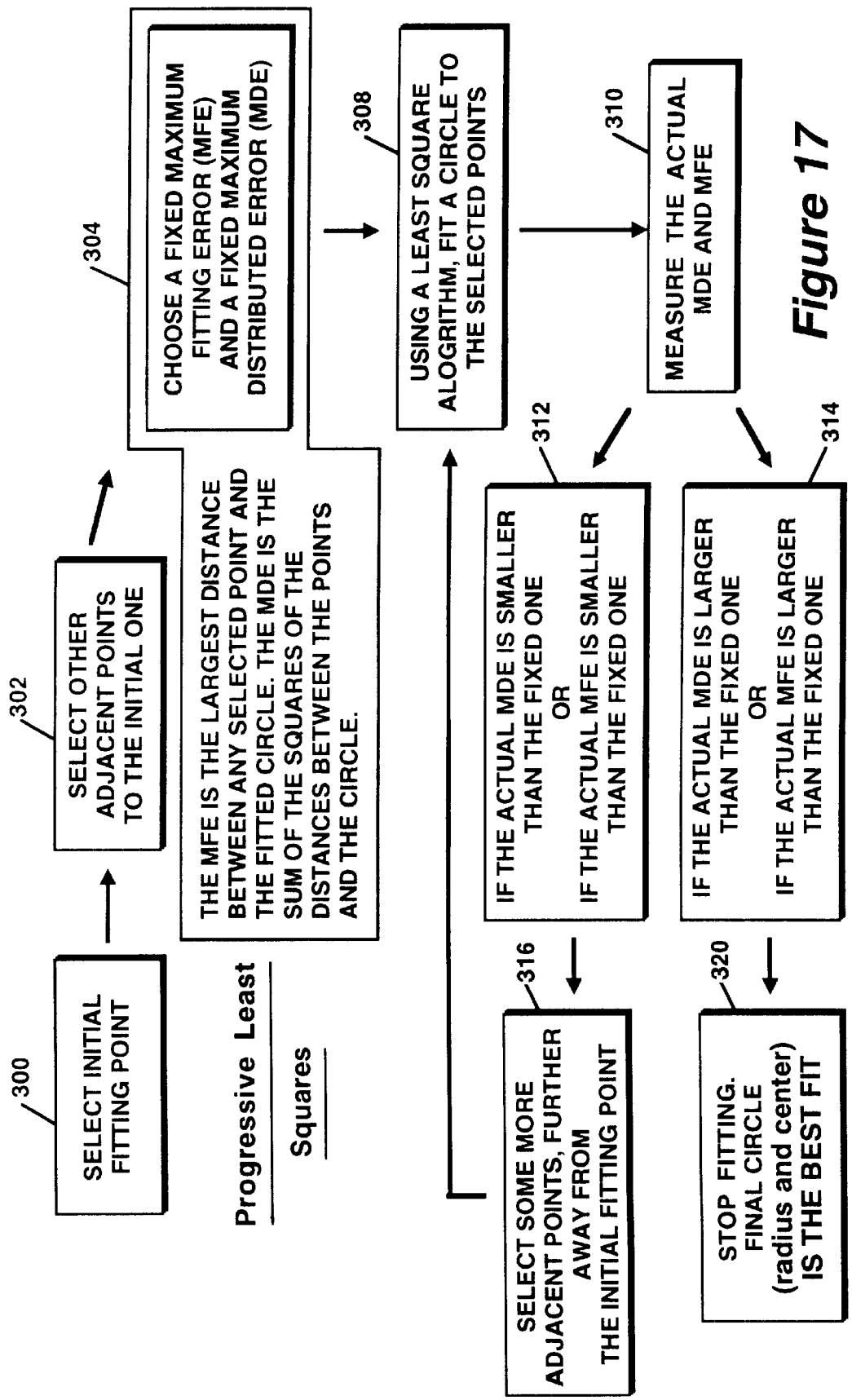
FIG. 17 is a flow diagram illustrating a progressive least squares technique for measuring the tip radius of a structure according to a further aspect of the invention.

Referring to the flow diagram of FIG. 17, after an image is obtained and deconvolved if necessary, a radius of curvature measurement may be performed by the signal processor 44 using a progressive least square fit technique according to a further aspect of the invention. According to this technique, an initial fitting point on the image is selected in step 300. Additional, adjacent points on the circle to be fitted are also selected by the AFM operator in step 302.

In step 304, a fixed Maximum Fitting Error (MFE) value and a fixed Maximum Distributed Error (MDE) value are selected. The MFE is the largest distance between any selected point on the image and the circle to be fitted. The MDE is the sum of the squares of the distances between the selected points on the image and the circle to be fitted.

Figure 18:
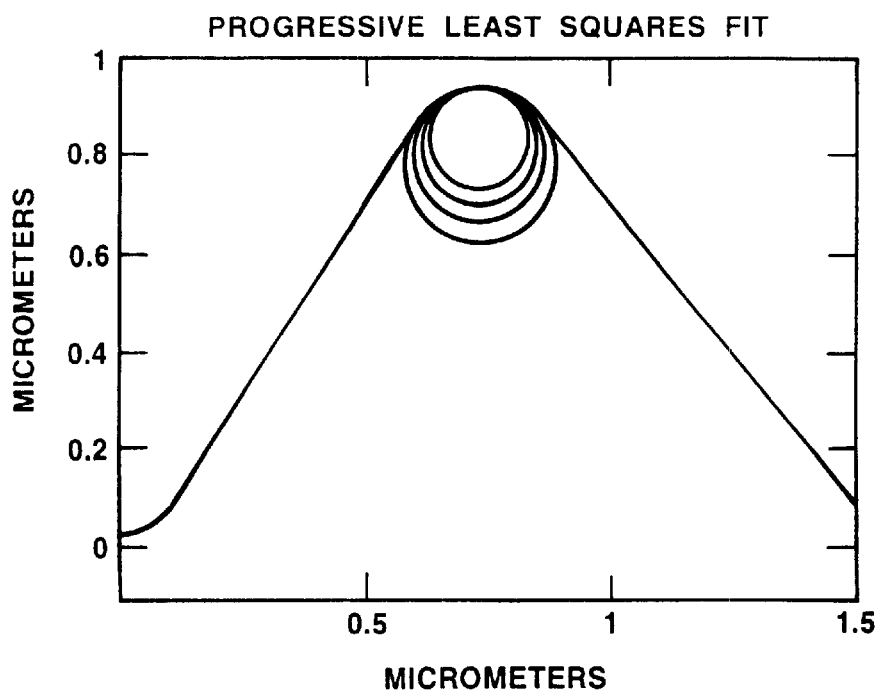
FIG. 18 illustrates use of the curve fitting technique of FIG. 17.

In step 308, a conventional least square algorithm is used to fit a circle to the points selected on the image. Thereafter, in step 310, the actual MDE and MFE values of the fitted circle are calculated. In the event that it is determined in step 312 that the actual MDE is smaller than the fixed MDE selected in step 304 or that the actual MFE is smaller than the fixed MFE selected in step 304, then more adjacent points on the image further away from the initial fitting point are selected in step 316 and step 308 is repeated, as shown. On the other hand, if it is determined in step 314 that the actual MDE is larger than the fixed NDE or that the actual MFE is larger than the fixed MFE, then the fitted circle represents the best fit and its radius thus, represents the radius of the imaged structure. With this arrangement, the number of datapoints is increased as long as the actual MDE and MFE are lower than the values selected in step 304 and the process terminates with the best fit once the selected MDE or MFE is exceeded. Thus, the best fit is the one that uses the greatest number of datapoints and keeps the errors to below the selected maxima. FIG. 18 shows the sequential iterations and fits until the final (and largest) circle is fitted.

It will be appreciated by those of ordinary skill in the art that the above-described method for measuring a radius of curvature may be implemented using only a single error value, such as the MFE or MDE. Further, different error measures may be used in the above-described process a weighted MDE with larger weights assigned to the points closer to the apex of the image.

The above-described progressive least squares technique is user independent and automatic. The data was compared to visual fits of images obtained with SEM and proved to be very accurate. Blind tests with more than 20 different samples with slightly different geometries and radii were conducted. Difference in the radii in the order of 5 nm was correctly captured.

The methods and apparatus of the invention permit the successful profiling of high aspect ratio nanoscopic features using an atomic force microscope operated in the contact mode. The difficulties of using an AFM with these types of structures stem from the fact that AFM technology was developed for mostly flat samples or features with small relative heights and/or smooth topography. While measurements of line width of micro trenches and micro steps in the semiconductor industry pushed the technology further, high aspect ratio structures present a new challenge. The present invention addresses and overcomes these challenges, including new probe landing techniques, a deconvolution technique, and a technique for measuring the tip radius of high aspect ratio structures.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims. All publications and references cited herein are expressly incorporated herein by reference in their entirety.

What is claimed is:

1. A method for imaging a feature of a sample comprising the steps of:
   visualizing a cantilever from which said probe extends and the feature to establish the relative position of the cantilever and the feature;
   moving at least one of the cantilever and the feature until the cantilever and the feature are in intersecting vertical alignment;
   moving the probe in a first scanning pattern until the probe contacts the feature; and
   moving the probe in a second scanning pattern to generate an image of the feature once the probe contacts the feature.

2. The method of claim 1 further comprising the step of bringing the cantilever into contact with the feature prior to moving the probe in the first scanning pattern.

3. The method of claim 1 wherein said first scanning pattern is a raster scan pattern, 4. The method of claim 1 wherein said second scanning pattern has a smaller area than said first scanning pattern.

5. The method of claim 1 further comprising raising the probe a predetermined distance once the feature is located with the probe.

6. A method for imaging a feature of a sample, comprising the steps of:
   (a) moving a probe extending from a cantilever and terminating at a probe tip relative to the feature until said probe tip is in close proximity to the feature;
   (b) moving the probe in a first scanning pattern in a horizontal plane;
   (c) if deflection of the cantilever has not occurred during the first scanning pattern, moving the probe to a lower horizontal plane and repeating step (b); and
   (d) if deflection of the cantilever has occurred during the first scanning pattern indicating that the probe has contacted said samples moving the probe in a second scanning pattern to generate an image of the feature.

7. Apparatus for imaging a feature of a sample, comprising:
   a probe extending from a cantilever;
   a course motion actuator for moving said cantilever into intersecting vertical alignment with said feature and to bring the cantilever into contact with the feature; and
   a controller operative to move said probe in a first scanning pattern after said cantilever contacts the feature until the probe contacts the feature and to move the probe in a second scanning pattern to generate an image of the feature once the probe contacts the feature.

8. The apparatus of claim 7 further comprising a fine motion actuator coupled to said probe and responsive to said controller for moving said probe in said first scanning pattern and in said second scanning pattern.

9. The apparatus of claim 7 further comprising a camera to facilitate actuation of said course motion actuator.

10. The apparatus of claim 7 further comprising a first camera positioned substantially vertically with respect to said sample and a second camera positioned substantially laterally with respect to said sample to facilitate actuation of said course motion actuator.

11. Apparatus for imaging a feature of sample, comprising:
   a probe; and
   a controller coupled to the probe and operative to (a) move the probe in a first scaring pattern in a horizontal plane, (b) if deflection of the cantilever is not detected, to move the probe to a lower horizontal plane and to repeat the first scanning pattern in the lower horizontal plane; and, (c) if deflection of the cantilever is detected indicating that the probe has contacted said sample, to move the probe in a second scanning pattern to generate an image of the feature.

* * * * *

UNITED STATES PATENT AND TRADEMARK OFFICE
CERTIFICATE OF CORRECTION

PATENT NO.   : 6,489,611 B1                                          Page 1 of 1
DATED        : December 3, 2002
INVENTOR(S)  : Bernardo D. Aumond et al.

It is certified that error appears in the above-identified patent and that said Letters Patent is hereby corrected as shown below:

Column 1,
Line 22, delete "these type" and replace with -- these types --.

Column 10,
Line 35, delete "0.51" and replace with -- 0.5 --.

Column 13,
Line 58, delete "to probe" and replace with -- the probe --.

Column 14,
Line 18, delete "tend flatten" and replace with -- tend to flatten --.
Line 67, delete "process a" and replace with -- process having a --.

Column 16,
Line 16, delete "samples" and replace with -- sample --.
Line 45, delete "scaring" and replace with -- scanning --.

Signed and Sealed this

Second Day of September, 2003

JAMES E. ROGAN
*Director of the United States Patent and Trademark Office*